US012587621B2

(12) United States Patent
    Maes et al.

(10) Patent No.:     US 12,587,621 B2
(45) Date of Patent:       Mar. 24, 2026

(54) LIGHT SOURCE DEVICE AND IMAGE PROJECTION DEVICE HAVING A LIGHT SOURCE DEVICE

(71) Applicant: BARCO N.V., Kortrijk (BE)

(72) Inventors: Dirk Maes, Bissegem (BE); Dries Jan Doornaert, Wevelgem (BE); Kurt Albert Callewaert, Oostnieuwkerke (BE)

(73) Assignee: BARCO N.V., Kortrijk (BE)

( * ) Notice:     Subject to any disclaimer, the term of this patent is extended or adjusted under 35 U.S.C. 154(b) by 403 days.

(21) Appl. No.:     18/249,158

(22) PCT Filed:     Oct. 15, 2021

(86) PCT No.:     PCT/EP2021/078598
    § 371 (c)(1),
    (2) Date:     Apr. 14, 2023

(87) PCT Pub. No.: WO2022/079232
    PCT Pub. Date: Apr. 21, 2022

(65)              Prior Publication Data
    US 2024/0031538 A1      Jan. 25, 2024

(30)      Foreign Application Priority Data
    Oct. 16, 2020     (EP) .................................... 20202434

(51) Int. Cl.
    G03B 21/20          (2006.01)
    H04N 9/31            (2006.01)
(52) U.S. Cl.
    CPC ......... H04N 9/3194 (2013.01); H04N 9/3152 (2013.01); H04N 9/3161 (2013.01); H04N 9/3167 (2013.01)

(58) Field of Classification Search
    CPC .............. G03B 21/2053; G03B 21/208; H04N 9/3152; H04N 9/3155; H04N 9/3161; H04N 9/3194
    See application file for complete search history.

(56)              References Cited
           U.S. PATENT DOCUMENTS
    10,069,275 B1     9/2018  Lee et al.
    10,073,333 B2     9/2018  Nishimori
               (Continued)

FOREIGN PATENT DOCUMENTS
    EP          2916163 A2      9/2015
    EP          3121649 A1      1/2017
               (Continued)

OTHER PUBLICATIONS

International Search Report and Written Opinion issued in PCT/EP2021/078598, dated Feb. 8, 2022, 13 pages provided.
               (Continued)

*Primary Examiner* — Ryan D Howard
(74) *Attorney, Agent, or Firm* — HSML P.C.

(57)              ABSTRACT

The invention provides an optical apparatus configured to monitor a state of a diffuser illuminated by a light source, at least one light beam comprising at least one bundle of rays of light exiting the diffuser being for illumination of a transmissive or reflective spatial light modulator of a projector, further comprising a sampler that samples the light beam exiting the diffuser and re-directs the light beam sample towards a detection system, wherein the detection system is coupled to an analyzer that generates a signal when an anomaly is detected in the distribution of the light intensity in a cross-section of the sample of the light beam. It also provides a method of monitoring a state of a diffuser illuminated by a coherent light source.

19 Claims, 20 Drawing Sheets

(56)  References Cited

U.S. PATENT DOCUMENTS

| 10,073,336 | B2 | 9/2018 | Maes et al. |
| 2009/0096994 | A1 | 4/2009 | Smits |
| 2009/0147224 | A1 | 6/2009 | Kurozuka et al. |
| 2009/0153063 | A1 | 6/2009 | Sudo |
| 2009/0179882 | A1 | 7/2009 | Uchiyama et al. |
| 2010/0201894 | A1 | 8/2010 | Nakayama et al. |
| 2015/0325323 | A1* | 11/2015 | Brukilacchio ..... G02B 19/0028 |
| | | | 250/504 R |
| 2016/0205363 | A1 | 7/2016 | Okumura |
| 2017/0013240 | A1 | 1/2017 | Chikahisa |

FOREIGN PATENT DOCUMENTS

| JP | 2005283658 | A | 10/2005 |
| JP | 2010044204 | A | 2/2010 |
| WO | 2009035401 | A2 | 3/2009 |
| WO | 2009035041 | A1 | 12/2010 |
| WO | 2015004724 | A1 | 1/2015 |

OTHER PUBLICATIONS

European Search Opinion issued in EP20202434.5, dated Apr. 14, 2021.

European Search Report issued in EP20202434.5, dated Apr. 14, 2021.

* cited by examiner

Diffuser

LIGHT SOURCE DEVICE AND IMAGE PROJECTION DEVICE HAVING A LIGHT SOURCE DEVICE

The present invention relates to any or all of a light source device, an image projection device having the light source device, a method of operating an image projection device having the light source device or a method of making a light source and/or a method of making an image projection device having the light source device. The present invention also relates to an optical apparatus and method configured to monitor a state of a diffuser illuminated by a coherent light source, and the use of such a system or method in a projector.

BACKGROUND

U.S. Pat. No. 10,073,336B2 "Projection system with safety detection" discloses a projection system with laser projection including a safety detection system for a protected space. The safety detection system detects whether or not an object (e.g. a person or a highly reflecting surface) is within the projection cone. If an object is detected in the area in front of the projector where the laser light levels exceed the maximum permissible exposure, the system turns-off the light source to avoid exposure to unsafe laser light levels, either direct or via specular reflection. The proposed solution does not allow for detection of damages to a diffuser inside of the projection system.

There are projection systems which project higher light intensities at highlighted positions of a projected image. FIGS. 1A and 1B show two examples of a situation that can materialize in a highlight projection system. In both figures, there is a pinhole defect 2 at the same position of the diffuser 1.

In FIG. 1A, the light of the highlight projector is concentrated around the pinhole defect 2. As a result, more coherent light 3 than desired can pass through the pinhole 2 without being diffused.

In FIG. 1B, the light of the highlight projector is concentrated at another position of the diffuser 1, remote from the pinhole defect 2. In that case, the optical system performs as if there were no damage to the diffusor.

While it could be required to shut down the highlight projector in the case of the situation as shown in FIG. 1A (e.g. for safety reasons), it may be tolerable to continue operating the highlight projector in the case of FIG. 1B.

U.S. Pat. No. 10,069,275 "Beam projector module using laser" describes a system with a sensor that senses light reflected back by a diffuser and shuts off the laser power if the reflected light falls below a threshold value as a result of the diffuser being detached from the frame.

The technique proposed in U.S. Pat. No. 10,069,275 does not allow for the detection of each and every minute damage to the diffuser (like e.g. a pinhole defect) which can be located anywhere on the diffuser. For instance, the output signal of the detector can vary widely in function of the position across the diffuser of a pinhole defect in said diffuser. Also, if the pinhole is only a small part of the active area of the diffuser, the detector will be unable to detect the pinhole. In other words, a detection system built according to U.S. Pat. No. 10,069,275 may not be able to discriminate between the situations illustrated in FIGS. 1A and 1B.

EP3121649 "Light source device and image projection device having light source device" discloses different solutions to monitor the state of a diffuser substrate by capacitive, thermal, magnetic or electrical sensors. The problem with this solution is that a significant change of an optical characteristic of the optical system (like e.g. a pinhole, a crack, etc. . . . ) is not guaranteed to cause a significant change in an electrical, thermal or magnetic characteristic of the optical system.

As was the case previously, the solutions described in EP3121649 do not allow discriminating between the situations of FIG. 1A and FIG. 1B.

Definitions and Acronyms

Aperture (stop). An optical or mechanical component that limits the (lateral) size of a bundle of light rays. For example, an aperture stop of an imaging system is the optical or mechanical element that limits angle of rays passing through the system from a source on the optical axis. For an off-axis object, the chief ray is the ray that passes through the center of the aperture stop, and the marginal rays are those that pass through the edge of the aperture stop. The size of the aperture stop determines the light-gathering capability of an optical device, and, thus, the brightness of its images.

Reference to an "aperture" usually refers to the opening through which a light beam passes whereby the aperture limits the extent of the beam incident on the aperture stop.

Telecentric Lens. A compound lens system that has its entrance and/or exit pupil at infinity. This means that the chief rays, i.e. oblique rays that pass through the center of the aperture stop, are parallel to the optical axis in front of or behind the compound lens system, respectively.

Object-space Telecentric Lens. A compound lens system that has its entrance pupil at infinity. Rays originating from the object parallel to the optical axis pass through the center of the aperture stop.

Image-space Telecentric Lens. A compound lens system that has its exit pupil at infinity. Rays incident on the image parallel to the optical axis pass through the center of the aperture stop.

Bi-telecentric Lens. A compound lens system that has both its entrance and exit pupil at infinity.

Base projector. A base projector is a traditional projector with uniform illumination which comprises an amplitude modulator per color or one amplitude modulator with the primary colours being presented in sequence to the amplitude modulator. A base projector is an optical device that projects a full image such as full moving images onto a surface. To create a full image (rather than a highlight), a uniform illumination is applied to an amplitude modulator per color.

Optical Diffuser. Diffusers are described on page 170, line 8 to page 172, line 6 of "Projection Displays", Stupp and Brennesholtz, John Wiley & Sons, 1999, ISBN 0 471 98253 9. An optical diffuser (also known as a diffuser) diffuses light evenly in a wide variety of applications. Optical Diffusers cause light to spread evenly across a surface thereby removing or minimizing bright spots. Optical Diffusers are also ideal for use as screens or targets in imaging applications. Optical Diffusers are also known as Light Diffusers in many illumination applications. The exit of Optical Diffusers typically has rays at a wide range of different angles.

Diffuse light from an optical diffuser can, for instance, be obtained by reflecting light from a white surface, or by transmitting light through a translucent material, including ground glass, certain plastics, holographs, opal glass, frosted glass, greyed glass or, for example, by surface treatments such as sand blasting one or both surfaces of a substrate (e.g. glass or another transparent material) or by mixing small particles (e.g. titanium dioxide) in a resin that can be coated on a substrate before being polymerized.

A particular type of diffuser is the phosphor type diffuser that converts the incident wavelength to light with longer or shorter wavelengths than the wavelength of the incident light.

The diffuser sheet can be a bulk diffuser or a surface diffuser. A state of the art diffuser is, for instance, a frosted glass diffuser from Sigma Koki, Japan. FIG. 1C shows, as an example, the increase of the intrinsic etendue with a diffuser in an illumination system.

Assuming that a collimated laser beam in an illumination system, with circular cross section and diameter $d_0$, is incident on a diffuser sheet, the diffuser has a scattering half cone angle $\phi_1$ and the light emitting area of the diffuser, seen from position to the right, becomes a circle with diameter $d_1$. A schematic image is shown in FIG. 1C. Due to the scattering of the diffuser sheet, $d_1$ is greater than $d_0$.

After the diffuser the étendue is increased to a value $$\frac{d_1^2 \pi^2}{4} \sin^2 \varphi_1.$$

A Gaussian diffuser scatters light completely randomly. When a narrow angle beam of light is directed through a Gaussian diffuser, the output has the typical Gaussian bell-shaped light intensity profile distribution. A diffuser is typically characterized by its Full Width Half Maximum (FWHM) angle. The larger the FWHM angle, the stronger the diffuser.

Diffusers have a typical feature size determined by the typical size of the surface structure in case of a surface diffuser or by the typical size of a particle in case of a bulk diffuser. Only when a light beam is significantly larger than the typical feature size of the diffuser, can the average intensity and angle profile be guaranteed.

Coherent light. A beam of coherent light is light in which the phases of all electromagnetic waves at each point on a line normal to the direction of the beam are identical. Coherent light is usually monochromatic, and the most common source of such light for practical uses is from a laser.

Exit pupil. An exit pupil is a virtual aperture in an optical system and is the image of the aperture stop in the optics that follow it. Only rays which pass through this virtual aperture can exit the system. Instead of "exit pupil" the term "Ramsden disc" can be used.

Projection Lens—Exit Pupil. The exit pupil of a projection lens in a projector is the optical image of the aperture stop in the projection lens as seen through the back of the projection lens (i.e. the image side or projection screen side). Optical elements between the projection lens aperture stop and the screen will produce a magnified or diminished image of the physical aperture that is displaced from the physical location of the aperture stop. Hence, the projection lens exit pupil is the virtual image of the projection lens aperture stop as seen by an observer standing in between the projector and the projection screen.

FWHM (Full Width at Half Maximum). Full width at half maximum (FWHM) is an expression of the extent of function given by the difference between the two extreme values of the independent variable at which the dependent variable is equal to half of its maximum value. In other words, it is the width of a spectrum curve measured between those points on the y-axis which are half the maximum amplitude.

FIG. 1D illustrates this with a function f reaching a maximum value $f_{max}$. The function has the value $\frac{1}{2} f_{max}$ for $x=x_1$ and $x=x_2$. The full width at half maximum (FWHM) is the difference $x_2-x_1$.

Highlight projector. See highlighter projector.

Highlighter projector. A highlighter projector can be a projector which comprises a dual modulation stage. In a first modulation stage, the light from the source is distributed, i.e. steered, to provide a high illumination level at positions where the final image has a high intensity (i.e. the provision of the highlights) and a low illumination level at positions where the final image has a low intensity. The first modulation stage may comprise, for example, a phase modulator or a phase only modulator per color. A second modulation stage may comprise an amplitude modulator per color to attenuate the illumination profile delivered by the first modulation stage in order to provide the precise brightness and color for each pixel in the image. The second modulation stage can be said to trim the illumination profile delivered by the first modulation stage.

Hybrid projector. A hybrid projector is a projector which combines the functionality of a Highlighter projector and a Base projector, while using only one amplitude modulator per color. A portion of the light is processed by the phase modulator to generate a highlight illumination pattern onto the amplitude modulator, another portion of the light is uniformly distributed onto the amplitude modulator to be used for creating the projected image.

IEC 62471-5:2015. International standard providing requirements regarding photobiological safety of the optical radiation emitted by image projectors.

Dual Projector setup. A dual projector setup combines a Base Projector and a Highlighter Projector to create a combined image. The two images to be projected can be combined onto the screen or the optical paths can be combined into a single projection lens. The term Dual projector setup will be used when the base image and the highlight image are each processed by a separate amplitude modulator. The amplitude modulator can be a reflective amplitude modulator such as, for instance, a digital micromirror array device (DMD) or an LCOS. The amplitude modulator can also be a transmissive amplitude modulator such as light valve whereby an LCD is an example, but the absorption of light in the LCD can limit the power of the laser light that can be used.

Nominal. According to plan, for example a result that can be expected, typical.

Amplitude modulator, phase modulator, transmissive or reflective spatial light modulator or light valve.

Phase Modulator. A phase modulator or a phase only modulator is a device which introduces phase variations on an incident wavefront, e.g. light wavefront. In embodiments of the present invention, phase patterns are applied with such a resolution that it creates a smooth and low detail image which can be projected onto an amplitude modulator. Different technological designs can be used to provide a phase modulator which can be reflective or transmissive. These devices include microelectromechanical (MEMS) displays, which provide a very fast temporal response but a low spatial resolution. MEMs devices can be configured to be used as phase modulators but in most cases these devices will actually be used as mirrors to deflect light and send it to a desired spot, i.e. as amplitude modulators. These then work in refractive mode, whereas phase modulators work in diffractive mode. Other suitable phase modulators are transmissive pixelated Liquid Crystal (LC) and reflective pixelated Liquid Crystal On Silicon (LCOS) modulators.

An amplitude spatial light modulator is a device which directs incident light pixel-by-pixel towards a projector, e.g. a projector lens or to a dump or sink. In embodiments of the present invention, it creates a sharp image but has the disadvantage that light is dumped. Different technological designs can be used to provide a spatial light modulator which can be reflective or transmissive. These devices include microelectromechanical (MEMS or LCOS) displays, which provide a very fast temporal response. Such MEMs devices can comprise an array of tiltable mirrors to deflect light on a pixel-by-pixel basis and send it to a desired spot, i.e. towards the projector lens or to a sink or dump.

Deformable or tiltable mirrors as used, for example, in the field of adaptive optics, can also be used. Transmissive light valves such as LCD displays can also be used, which include liquid crystal on silicon (LCoS) reflective devices, which have the advantage of offering a high spatial resolution, high speed and a high pixel fill factor. Liquid crystal displays used in transmission can also be used.

Dynamically addressable phase modulating elements for use in embodiments of the present invention include reflective 2D arrays of reflective phase controlling elements or can include transmissive 2D arrays, e.g. of controllable liquid crystal elements. These elements have the property that the elements can be controlled to selectively retard the phase of laser light, effectively causing a change in path-length. Devices that can controllably adjust the phase of light of different areas include Phase Modulating Devices (PMD). PMDs may be transmissive or reflective. Some PMDs can individually control the phase of the light in a 2D array made up of a large number of pixels. Dynamically-addressable phase modulating elements can have one or more scanning mirrors, such as a 2D or 3D microelectromechanical system (MEMS), (e.g. DMDs) can be used.

Spatial light modulator (SLM) is a general term describing devices that are used to modulate amplitude, phase, or polarization of light waves in space and time. For example, applying a voltage leads to a variable tilt of the liquid crystal molecules due to their electrical anisotropy. As liquid crystal molecules also show optical anisotropy, this tilt changes the refractive index of the liquid crystal molecules which causes a modified optical path length within the liquid crystal cell. The addressed gray level is, hence, converted into a phase level. Embodiments of the present invention make of use a spatial light modulator in phase modulation mode for light steering.

Phase modulator or phase panel is a diffractive optical element, for example an electrically addressed liquid-crystal spatial light modulator, a liquid crystal on silicon spatial light modulator, all of which provide phase modulation. Spatial Light Modulator systems can be based, for example, on translucent (LCD) or reflective (LCOS) liquid crystal micro-displays.

Accordingly, phase modulation devices can include:

Spatial light modulators (SLM) having a 2D array of pixels, in which the drive level addressed at a pixel correlates to the phase delay applied to the light impinging on that pixel.

A spatial modulator can simultaneously change the state of polarization of the light. An example is a transmissive liquid-crystal display, or a reflective liquid crystal-on-Silicon display (LCoS)). Alternatively, such an SLM can be designed to affect the phase delay of that pixel, but not its polarization.

An acousto-optical modulator also called a Bragg cell can affect the deflection angle of the incoming light, its phase, frequency and polarization characteristics.

A grating light valve (GLV) includes an addressable array where in each pixel or element can vary the phase of the impinging light by mechanically varying the path length.

Deformable Mirrors can be either a continuously deformable mirror surface with an array of control points, or arrays of discrete, individually modulated reflective pixels.

Steering light/Light steering relates to redistributing light so that it forms a pattern. This is best achieved by a phase modulator or phase only modulator. By using positive reinforcing interference and negative interference of parts of a coherent light beam, such as a laser, an image can be produced with higher light intensity where one wants to have highlights. This highlight image or illumination can be combined with the output of a basic projector to create a highlighted image. There are various ways in which the highlighted image and the basic image can be combined.

Light steering differs from amplitude modulation e.g. with a DMD. Mirror elements of such a modulating device only have two states: reflecting towards a projector lens for projection and display or reflecting to a light dump or sink. If an amplitude modulator is used to generate highlights, then this will be done with a lower efficiency than a phase modulator because of the dumped light. It also means that the highlighting is less intense.

Shaped light SL refers to highlights in an image which have been obtained by redistributing light, for example by means of a phase modulator. This differs from amplitude modulated light wherein the modulator has two states—one for passing light through and one for dumping the light. Hence, components of such an image are cancelled or allowed through whereas phase modulation redistributes the light of a light beam.

Point Spread Function (PSF). The point spread function (PSF) describes the response of an imaging system to a point like target. A more general term for the PSF is a system's impulse response, the PSF being the impulse response of a focused optical system. The PSF in many contexts can be thought of as the extended blob in an image that represents a single point object. In functional terms it is the spatial domain version of the optical transfer function of the imaging system.

Central position/peripheral position. The central position and peripheral position relate to positions in the aperture which are located close to the centre thereof and more towards the periphery of the aperture, respectively.

The first photodetector or photosensor monitors the light at the central position. The second photodetector or photosensor monitors the light at the peripheral position. The extent of the central position and the extent of the peripheral position should be chosen so that a defective diffuser will alter the light received by the central or peripheral photosensor or photodetector so that these two measurements are confused with each other, e.g. are monitoring overlapping zones.

The central position corresponds nominally to light falling at 0° at the aperture. However, angle deviations can be generated in the order of +/−3.5°. In an optical system with a diffuser, it is preferred if the area of the central position, which is monitored by a first photodetector or photosensor, is configured to capture the entire range of angular deviations (e.g. +/−3.5°) in both horizontal and vertical directions.

The second peripheral photodetector or photosensor preferably monitors outside this range of angles, relevant to the central position, e.g. >4°, preferably >5° more preferably 6° or larger. The maximum angle can be defined by the F-number of the optical system which may be 10.5 degrees, for example. An angle range which keeps the monitoring of light intensity at the peripheral position by the second photodetector or photosensor away from the angular range monitored by the first photodetector or photosensor at the central position can be selected to be an angle of 4° to 8° or 3° to 9°, typically 6°.

SUMMARY OF THE INVENTION

Figure 1A:
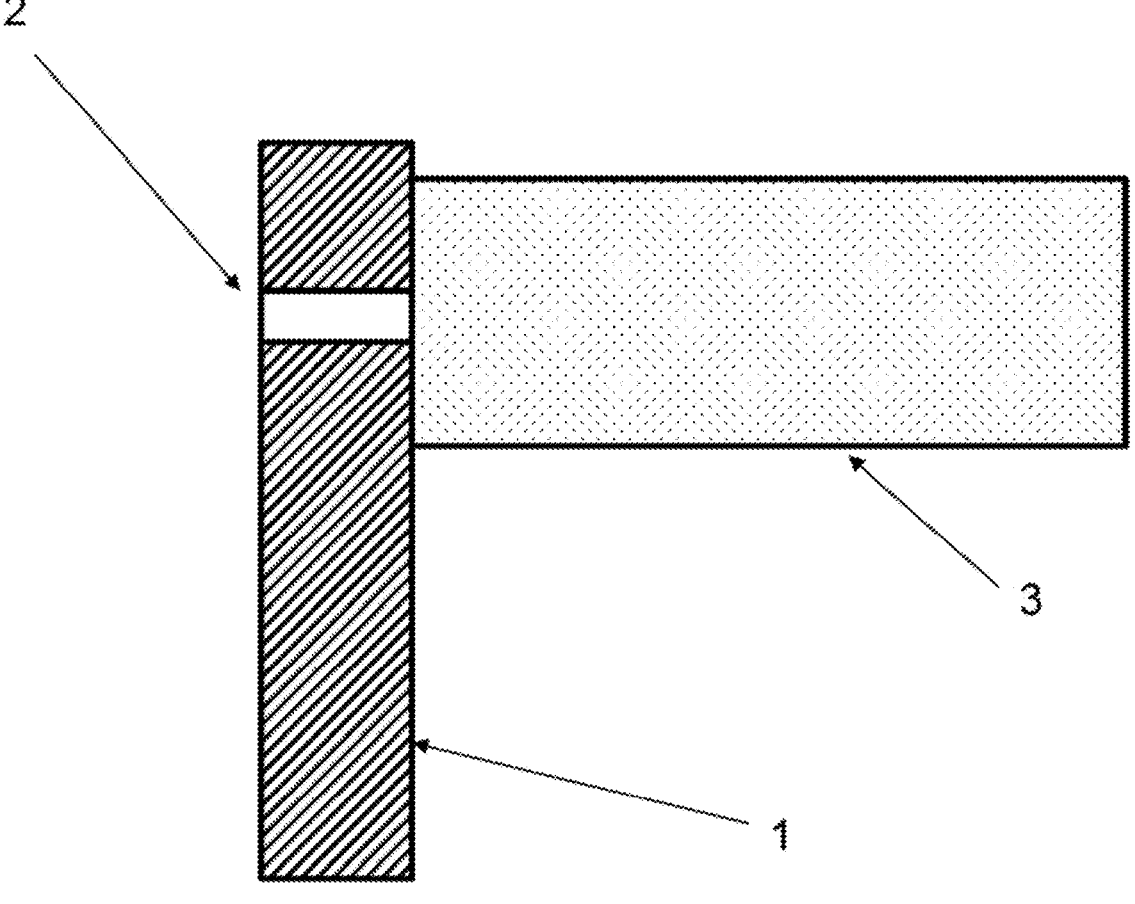
FIGS. 1A and 1B show two particular cases relevant to the safety of a laser-based projection system that differ by the relative position of a defect such as a break (opening) in a diffuser and a laser spot on the diffuser.
Figure 1B:
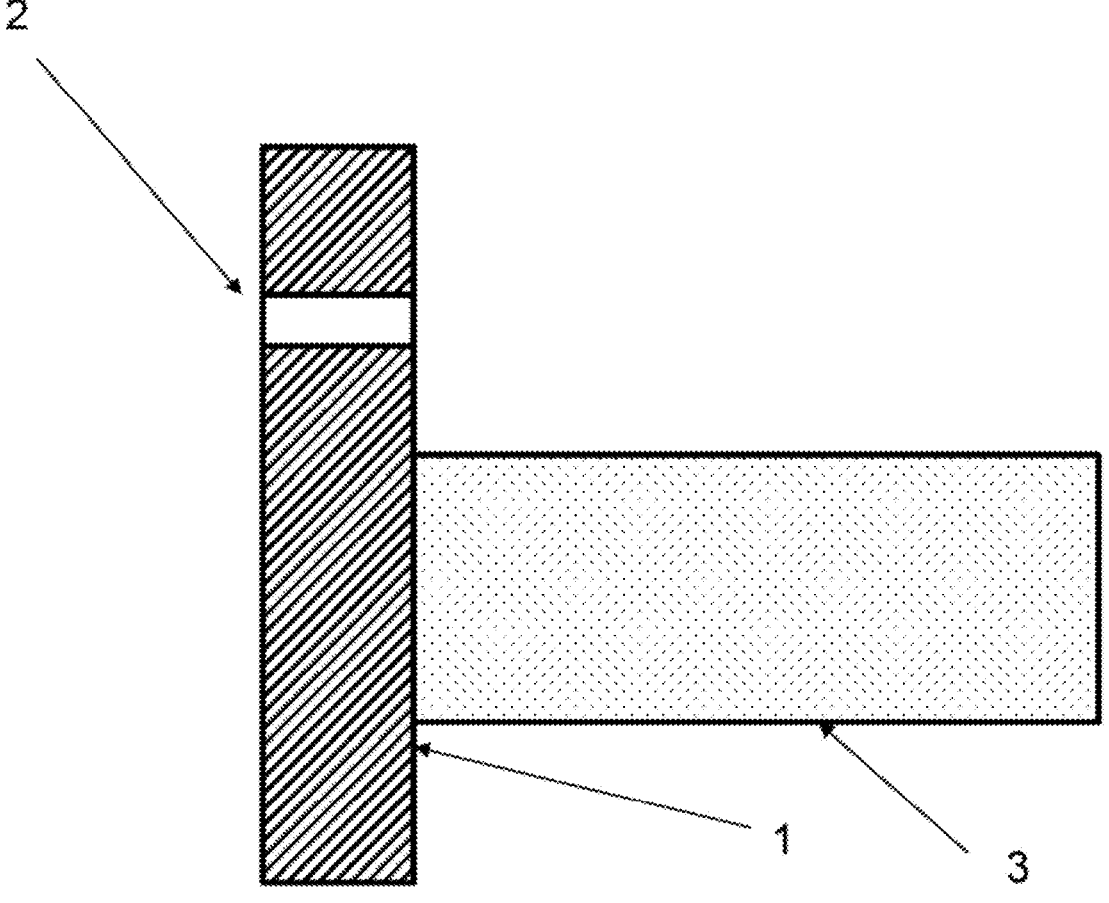
Figure 1C:
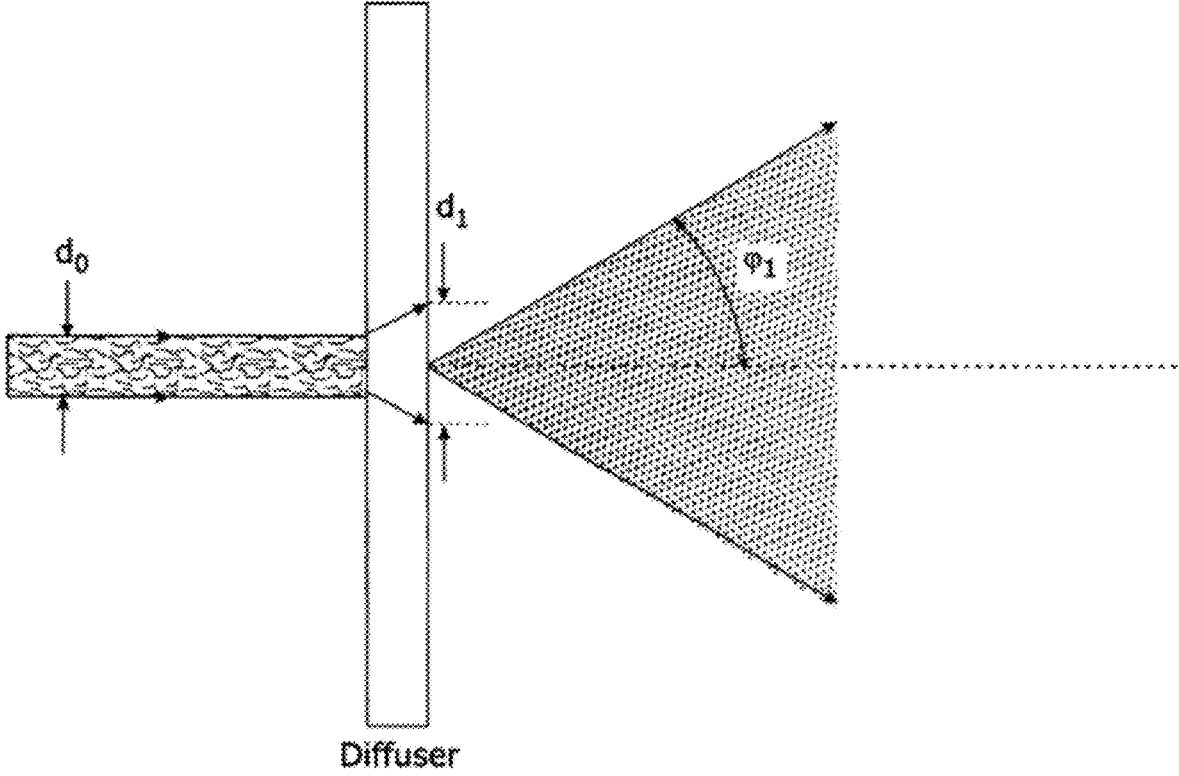
FIG. 1C illustrates the etendue of a diffuser.
Figure 1D:
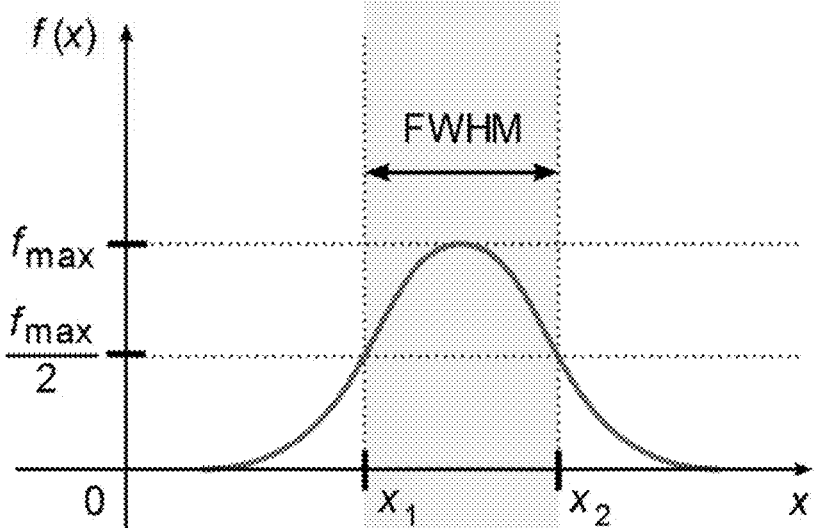
FIG. 1D illustrates the concept of Full Width at Half Maximum.

Embodiments of the present invention provide any or all of a light source device, an image projection device having the light source device, a method of operating an image projection device having the light source device or a method of making a light source and/or a method of making an image projection device having the light source device. Embodiments of the present invention provide an optical apparatus and a method configured to monitor a state of a diffuser illuminated by a coherent light source, and the use of such a system or method in a projector. The optical apparatus and method may be configured to detect the status of one or more diffusers and to generate signals such as alarm signals when a failing diffuser is detected. Embodiments of the present invention provide a laser projector safety apparatus and a laser projector safety method to reduce the risk of eye damage.

In particular:

(a) Embodiments of the present invention can relate to sampling of a light distribution in an aperture plane.

In a first embodiments of the present invention, an apparatus and a method are provided to monitor the state of a diffuser or more than one diffuser illuminated by a coherent light source, the light exiting the diffuser or diffusers being for illumination of a spatial light modulator such as a transmissive or reflective amplitude modulator such as a DMD or a light valve like an LCD of a projector.

The apparatus and method can comprise a sampler that samples the light beam exiting the diffuser and re-directs the light sample towards a detection system. The detection system can include one or more detectors. The detector(s) can be coupled to an analyzer that generates a signal such as an alarm when an anomaly is detected in the distribution of the light intensity in a cross section of the sample of the light beam. The cross section can be an attenuated copy of the cross section in the aperture plane. For example, the detection system can be adapted to evaluate the distribution of light in the exit pupil of the projection system. This can be achieved by sampling the bundle of rays of light exiting the diffusor with a sampler positioned between the exit surface of the diffuser and the light valve. For example, intensity differences (preferably as detected by a change in a ratio) between two positions such as a peripheral position and the center of the bundle of rays can indicate a damaged/failing diffuser.

It is an advantage of these embodiments of the present invention that, instead of evaluating secondary effects (like a change in, for example, mass, capacitance etc.) of a failing diffuser, the proposed detection system evaluates the distribution of light in the exit pupil of the projection system. This is achieved by sampling the bundle of rays of light exiting the diffusor with a sampler positioned between the exit surface of the diffuser and the reflective or transmissive amplitude modulator, such as a DMD or a light valve.

The sampler can be a semi-transparent mirror. Preferably, the majority of the light is transmitted towards the reflective or transmissive amplitude modulator such as a DMD or a light valve and only a very small portion of the light is reflected towards the detector. For example, the portion can be 5% or less of the incident light on the diffuser, for example 0.01-3% and in particular 5% or less of the intensity or optical power of the incident light beam, for example 0.01-3%.

The detector can be a photo-sensor, a linear array of photo-sensors or more generally an array of N column and M lines of photo-sensors. The photo-sensor(s) can be photodiode(s), photoresistor(s), phototransistor(s) or similar.

In a particular embodiment, the detector can be a pair of light sensors.

The aperture is filled with light and all rays of light that exit the diffusor with the same angle end up at the same point in the aperture.

(b) Embodiments of the present invention can relate to a linear detector array to detect a FWHM change which is a criterion to detect the failure of a diffuser. The linear detector array can be a line sensor with multiple photosensor elements which are positioned to extend from the center of an intensity profile to an edge of the intensity profile. The multiple photosensor elements can include photodiodes, photoresistors, phototransistors or similar, and drive electronics to monitor these photosensors.

The array is preferably linear (i.e. 2 or more photodetectors distributed over a straight line) or a 2D array (with 3 or more photodetectors distributed in a plane). The array can be regular (i.e. the photodetectors are positioned at regular intervals) or not.

The position of the photodetectors can take advantage of symmetries present in the system. For instance, the light distribution (when the diffusor is intact) can be symmetrical around the optical axis of the system. In that case, the photodetectors can be distributed along a line perpendicular with and intersecting the optical axis.

(c) Embodiments of the present invention can relate to select on polarization to block base illumination in a projector. A depolarizer can be installed at an aperture plane, to make sure that light transmitted to an amplitude modulator (e.g. a DMD or LCOS or light valve such as an LCD) of the projector has no preferential polarization direction, such that when the projector is combined with a 3D polarization switcher in front of a lens, a base image to be projected and highlights of an image to be projected undergo equal transmission in both left and right perspective. Also, this depolarization step contributes to speckle reduction via polarization diversity. The light that is sampled with the sampler as described above such as a sampling plate before the depolarizer, can have one polarization direction for the base illumination and an orthogonal polarization direction for the steered highlight illumination. In that case, however, a polarizer installed on a detector such as a photosensor (e.g. a single photodetector implementation) or photosensors (double or two or more detectors or a detector array with multiple photodetectors) can block the base illumination while allowing the sampled highlight illumination to pass.

Hence, when shaped light (e.g. highlights) and base light are combined based on their polarization, it is possible to separate the shaped light and the base light before, for example right before, it reaches the photodetector by using a polarizer positioned between the sampling plate and the detector. Then, the majority of the light falling onto the detector is coming from the highlight path. A small residual leakage of base illumination can be tolerated as long as it is significantly weaker than the highlight illumination (for example <20% of the highlight illumination).

Embodiments of the present invention provide any or all of a light source device, an image projection device having the light source device, a method of operating an image projection device having the light source device or a method of making a light source and/or a method of making an image projection device having the light source device. Embodiments of the present invention provide an optical apparatus and a method configured to monitor a state of a diffuser illuminated by a coherent light source, and the use of such a system or method in a projector. The optical apparatus and method may be configured to detect the status of one or more diffusers and to generate signals such as alarm signals when a failing diffuser is detected. Embodiments of the present invention provide a laser projector safety apparatus and a laser projector safety method where the alarm signal is used to shut down the laser source or reduce the power of the laser source in order to reduce the risk of eye damage.

Embodiments of the present invention provide an image projection device comprising a light source and a diffusor failure detection device comprising an optical system in accordance with embodiments of the present invention.

Embodiments of the present invention provide a method of monitoring a state of a diffuser illuminated by a coherent light source, at least one light beam comprising at least one bundle of rays of light exiting the diffuser being for illumination of a transmissive or reflective spatial light modulator of a projector, further comprising sampling the light beam exiting the diffuser and re-directing the light beam sample towards a detection system, wherein the detection system is coupled to an analyzer that generates a signal when an anomaly is detected in the distribution of the light intensity in a cross-section of the sample of the light beam. For example, the detection system comprises one or more detectors and/or the detection system is configured to evaluate the distribution of light in an exit pupil of a projection lens. The detection system can consist of only two detectors. These preferably do not include cameras as these would be too slow.

The step of sampling preferably comprises sampling a light distribution in an aperture in an aperture plane.

The detection system can be configured to evaluate the distribution of light in an exit pupil of a projection lens, and/or wherein the aperture is filled with light and all rays of light that exit the diffuser with the same angle end up at the same point in the aperture.

Embodiments of the present invention provide an optical system configured to monitor a state of a diffuser illuminated by a light source, at least one light beam comprising at least one bundle of rays of light exiting the diffuser being for illumination of a transmissive or reflective spatial light modulator of a projector, further comprising a sampler that samples the light beam exiting the diffuser and re-directs the light beam sample towards a detection system, wherein the detection system is configured to receive the light beam and is coupled to an analyzer that generates a signal when an anomaly is detected in the distribution of the light intensity in a cross-section of the light beam sample, wherein the anomaly is detected as a decrease in intensity ratio between a peripheral position and a central position of the at least one bundle of rays or wherein the anomaly is detected as a change in FWHM.

The central position corresponds to 0° at the aperture. However, angle deviations can be generated in the order of +/−3.5°. In an optical system with only a single diffuser, it is preferred if the area of the central position which is monitored by a first photodetector or photosensor, is configured to capture the entire range of angular deviations (e.g. +/−3.5°) in both horizontal and vertical directions.

The second peripheral photodetector or photosensor preferably monitors outside this range of angles, relevant to the central position, e.g. >4°, preferably >5° more preferably 6° or larger. The maximum angle can be defined by the F-number of the optical system which may be 10.5 degrees, for example. An angle range which keeps the monitoring of light intensity at the peripheral position by the second photodetector or photosensor away from the angular range monitored by the first photodetector or photosensor at the central position can be selected to be 4° to 8° or 3° to 9° and typically 6°.

Embodiments of the present invention provide an optical system configured to monitor a state of a diffuser illuminated by a light source, at least one light beam comprising at least one bundle of rays of light exiting the diffuser being for illumination of a transmissive or reflective spatial light modulator of a projector, further comprising a sampler that samples the light beam exiting the diffuser and re-directs the light beam sample towards a detection system, wherein the detection system is configured to receive the light beam and is coupled to an analyzer that generates a signal when an anomaly is detected in the distribution of the light intensity in a cross-section of the light beam sample, wherein the light beam is incident on an aperture in an aperture plane and the sampler samples a light distribution in the aperture in the aperture plane, and the aperture is filled with light and all rays of light that exit the diffusor with the same angle end up at the same point in the aperture.

Embodiments of the present invention provide an optical system configured to monitor a state of a diffuser illuminated by a light source, at least one light beam comprising at least one bundle of rays of light exiting the diffuser being for illumination of a transmissive or reflective spatial light modulator of a projector, further comprising a sampler that samples the light beam exiting the diffuser and re-directs the light beam sample towards a detection system, wherein the detection system is configured to receive the light beam and is coupled to an analyzer that generates a signal when an anomaly is detected in the distribution of the light intensity in a cross-section of the light beam sample, the system being configured to image the diffuser onto the transmissive or reflective spatial light modulator and configured to be bi-telecentric or wherein the optical system is minimally configured to be object space telecentric.

Embodiments of the present invention provide an optical apparatus comprising a transmissive or reflective spatial light modulator of a projector, a depolarizer installed at an aperture plane so that a light beam transmitted to the transmissive or reflective spatial light modulator of the projector has no preferential polarization direction, further comprising a sampler that samples the light beam exiting the diffuser and re-directs the light beam sample towards a detection system, wherein light that is sampled with the sampler before the depolarizer, has one polarization direction for a base illumination and an orthogonal polarization direction for steered highlight illumination, and a polarizer installed in the detection system is configured to block the sampled base illumination while allowing the sampled highlight illumination to pass or vice versa.

Embodiments of the present invention provide a method of monitoring a state of a diffuser illuminated by a coherent light source, at least one light beam comprising at least one bundle of rays of light exiting the diffuser being for illumination of a transmissive or reflective spatial light modulator of a projector, further comprising sampling the light beam exiting the diffuser and re-directing the light beam sample towards a detection system, wherein the detection system is coupled to an analyzer that generates a signal when an anomaly is detected in the distribution of the light intensity in a cross-section of the sample of the light beam, further comprising detecting the anomaly as an increase but preferably only as a decrease in intensity ratio between a peripheral position and a central position of the at least one bundle of rays or wherein the anomaly is detected as a change in FWHM.

Embodiments of the present invention provide a method of monitoring a state of a diffuser illuminated by a coherent light source, at least one light beam comprising at least one bundle of rays of light exiting the diffuser being for illumination of a transmissive or reflective spatial light modulator of a projector, further comprising sampling the light beam exiting the diffuser and re-directing the light beam sample towards a detection system, wherein the detection system is coupled to an analyzer that generates a signal when an anomaly is detected in the distribution of the light intensity in a cross-section of the sample of the light beam, wherein the light beam is incident on an aperture in an aperture plane and the sampler samples a light distribution in the aperture in the aperture plane, and the aperture is filled with light and all rays of light that exit the diffusor with the same angle end up at the same point in the aperture.

Embodiments of the present invention provide a method of monitoring a state of a diffuser illuminated by a coherent light source, at least one light beam comprising at least one bundle of rays of light exiting the diffuser being for illumination of a transmissive or reflective spatial light modulator of a projector, further comprising sampling the light beam exiting the diffuser and re-directing the light beam sample towards a detection system, wherein the detection system is coupled to an analyzer that generates a signal when an anomaly is detected in the distribution of the light intensity in a cross-section of the sample of the light beam, further comprising imaging the diffuser onto the transmissive or reflective spatial light modulator and configuring the projector to be bi-telecentric or configuring the projector to be minimally configured to be object space telecentric.

Embodiments of the present invention provide a method of operating a transmissive or reflective spatial light modulator of a projector, a depolarizer being installed at an aperture plane so that light transmitted to the transmissive or reflective spatial light modulator of the projector has no preferential polarization direction, the method comprising sampling the light beam exiting the diffuser and re-directing the light beam sample towards a detection system, wherein light that is sampled with the sampler before the depolarizer, has one polarization direction for a base illumination and an orthogonal polarization direction for steered highlight illumination, and a polarizer installed in the detection system is configured to block the base illumination while allowing the sampled highlight illumination to pass or vice versa.

Any of the methods that are provided by the present invention can be used to operate an image projection device.

Embodiments of the present invention provide a method performed by a computer system, comprising a processing engine having digital processing capability which is adapted to carry out the respective functions by being programmed with one or more computer programs, wherein the processing engine may be selected from logic circuits, electronic hardware, processors or circuitry which can encompass any kind of logic or analog circuitry, integrated to any degree, and not limited to general purpose processors, digital signal processors, ASICs, FPGAs, discrete components or transistor logic gates and similar, the processing engine having memory, an operating system, ports and devices for data entry, a pointer device, serial or parallel ports to communicate other devices, network cards and connections to connect to a network, software being embodied in a computer program product adapted to carry out the functions of any of the methods of the present invention.

Embodiments of the present invention provide software embodied in a computer program product adapted to carry out the functions disclosed by any of the methods of the present invention when the software is executed on one or more processing engines.

Embodiments of the present invention provide a non-transitory signal storage medium storing this software.

Embodiments of the present invention provide a digital processor configured to carry out any of the method steps of the present invention.

Embodiments of the present invention provide a diffusor failure detection apparatus comprising the optical apparatus or optical system according to any of the embodiments of the present invention.

Embodiments of the present invention provide an image projection device comprising the above light source and the diffusor failure detection device, or an optical apparatus or an optical system according to any of the embodiments of the present invention.

Embodiments of the present invention provide a laser projector safety apparatus for a projector, comprising the optical apparatus or the optical system according to any of the embodiments of the present invention.

Embodiments of the present invention are disclosed below with reference to aspects of the present invention. A first aspect comprises an optical apparatus configured to monitor a state of a diffuser illuminated by a light source, at least one light beam comprising at least one bundle of rays of light exiting the diffuser being for illumination of a transmissive or reflective spatial light modulator of a projector, further comprising a sampler that samples the light beam exiting the diffuser and re-directs the light beam sample towards a detection system, wherein the detection system is coupled to an analyzer that generates a signal when an anomaly is detected in the distribution of the light intensity in a cross-section of the sample of the light beam.

Aspect 2. The optical system according to aspect 1, wherein the detection system comprises one or more detectors. The detection system can consist of only two detectors. These preferably do not include cameras as these would be too slow. The detection system can be configured to evaluate the distribution of light in an exit pupil of a projection lens.

Aspect 3. The optical system according to aspect 1 or 2, wherein the sampler samples a light distribution in an aperture in an aperture plane. The sampler can be positioned between an exit surface of the diffuser and a transmissive or reflective light spatial modulator and/or wherein the sampler is a semi-transparent mirror whereby a majority of light incident on the sampler is transmitted towards a reflective or transmissive spatial light modulator. As only a small amount of light is required for the detection system most of the light can be used for projection.

A depolarizer can be installed at an aperture plane so that a light beam transmitted to the transmissive or reflective spatial light modulator has no preferential polarization direction, wherein light that is sampled with the sampler before the depolarizer, has one polarization direction for a base illumination and an orthogonal polarization direction for steered highlight illumination, further comprising a polarizer installed in the detection system configured to block sampled base illumination while allowing sampled highlight illumination to pass or vice versa. This is an efficient way to make a detection in only one of sampled base illumination light and highlight illumination light. The optical system may be configured to select one of sampled base illumination light and highlight illumination light and to allow selecting the other light automatically.

Aspect 4. The optical system according to any previous aspect, wherein the signal is an alarm signal.

Aspect 5. The optical system according to any previous aspect, wherein the transmissive or reflective spatial light modulator is a DMD or an LCOS or a light valve of the projector.

Aspect 6. The optical system according to any of the previous aspects, wherein the cross section is an attenuated copy of the cross section of a light beam in the aperture. This requires a small amount of the available light for projection.

Aspect 7. The optical system according to any previous aspect, wherein the detection system is configured to evaluate the distribution of light in an exit pupil of the projection lens.

Aspect 8. The optical system according to any previous aspect wherein the sampler is positioned between an exit surface of the diffuser and the transmissive or reflective spatial light modulator.

Aspect 9. The optical system according to any previous aspect, wherein the anomaly is an increased intensity difference between a peripheral position and the center of the bundle of rays which indicates a damaged/failing diffuser, and/or the anomaly can be detected as a change in FWHM.

Aspect 10. The optical system according to any previous aspect, wherein the sampler is a semi-transparent mirror whereby a majority of light incident on the sampler is transmitted towards the reflective or transmissive spatial light modulator.

Aspect 11. The optical system according to any previous aspect, wherein the portion of the light that is reflected towards the detection system is lower than 5% of the incident light on the diffuser and preferably in the range of 0.01-3%. This also requires only a small amount of the available light for detection.

Aspect 12. The optical system according to any the aspects 2 to 10, wherein the detector is a photo-sensor, a linear array of photo-sensors or an array of N columns and M lines of photo-sensors. The detector can be or can consist of a pair of light sensors. The detector is preferably not a camera. Only two detectors are required.

Aspect 13. The optical system according to aspect 12, wherein the photo-sensor(s) are photodiode(s), photo-resistor(s), phototransistor(s) or similar.

Aspect 14. The optical system according to any of the aspects 2 to 12, wherein the detector is a pair of light sensors, e.g. only a pair of light sensors.

Aspect 15. The optical system according to aspect 1, wherein the aperture is filled with light and all rays of light that exit the diffusor with the same angle end up at the same point in the aperture.

Aspect 16. The optical system according to any previous aspect, wherein the anomaly is detected as a change in FWHM.

Aspect 17. The optical system according to any previous aspect, configured to image the diffuser onto the transmissive or reflective spatial light modulator and configured to be bi-telecentric.

Aspect 18. The optical system according to any previous aspect wherein the optical system is minimally configured to be object space telecentric.

Aspect 19 is a diffusor failure detection apparatus comprising the optical system according to any previous aspect.

Aspect 20. An image projection device comprising a light source and the diffusor failure detection device of aspect 19, or an optical system according to any of the aspects 1 to 18.

Aspect 21. A laser projector safety apparatus for a projector, comprising the optical system according to any of the aspects 1 to 18.

Aspect 22. An optical apparatus comprising a transmissive or reflective spatial light modulator of a projector, a depolarizer installed at an aperture plane so that a light beam transmitted to the transmissive or reflective spatial light modulator of the projector has no preferential polarization direction, further comprising a sampler that samples the light beam exiting the diffuser and re-directs the light beam sample towards a detection system, wherein light that is sampled with the sampler before the depolarizer, has one polarization direction for a base illumination and an orthogonal polarization direction for steered highlight illumination, and a polarizer installed in the detection system is configured to block the sampled base illumination while allowing the sampled highlight illumination to pass or vice versa.

Aspect 23. The optical apparatus according to aspect 22, wherein the detection system comprises one or more detectors, the detection system being coupled to an analyzer that generates a signal when an anomaly is detected in the distribution of the light intensity in a cross-section of the sample of the light beam.

Aspect 24. The optical apparatus according to aspect 22 or 23, further comprising a 3D polarization switcher in front of a lens, wherein a base image to be projected and highlights of an image to be projected undergo equal transmission.

Aspect 25. The optical apparatus according to any of the aspects 22 to 24, wherein when shaped light and base light are combined based on their respective polarization, the shaped light and the base light are separated before the light reaches the detection system by using a polarizer positioned between the sampler and the detection system.

Aspect 26. The optical apparatus according to aspect 25, wherein the majority of the light falling onto the detection system is highlights.

Aspect 27. The optical apparatus according to aspect 25 or 26, wherein a residual leakage of base illumination is <20% of the highlight illumination.

Aspect 28. The optical system according to any of the aspects 22 to 27, wherein the sampler samples a light distribution in an aperture in an aperture plane.

Aspect 29. The optical system according to any of the aspects 22 to 28, further comprising a diffuser illuminated by at least one light beam from a coherent light source, the at least one light beam comprising at least one bundle of rays of light exiting the diffuser being for illumination of the transmissive or reflective spatial light modulator of the projector, wherein the detection system is coupled to an analyzer that generates a signal when an anomaly is detected in the distribution of the light intensity in a cross-section of the sample of the light beam.

Aspect 30. The optical system according to aspect 29, wherein the signal is an alarm signal.

Aspect 31. The optical system according to any of the aspects 22 to 30, wherein the transmissive or reflective spatial light modulator is a DMD or an LCOS or a light valve of the projector.

Aspect 32. The optical system according to any of the aspects 29 to 31, wherein the cross section is an attenuated copy of the cross section of a light beam in the aperture.

Aspect 33. The optical system according to any of the aspects 22 to 32, wherein the detection system is configured to evaluate the distribution of light in an exit pupil of the projector.

Aspect 34. The optical system according to any of the aspects 29 to 33, wherein the sampler is positioned between an exit surface of the diffuser and the transmissive or reflective spatial light modulator.

Aspect 35. The optical system according to any of the aspects 29 to 34, wherein the anomaly is an intensity difference between a peripheral position and the center of the bundle of rays which indicates a damaged/failing diffuser.

Aspect 36. The optical system according to any of the aspects 22 to 35, wherein the sampler is a semi-transparent mirror whereby a majority of light incident on the sampler is transmitted towards the reflective or transmissive spatial light modulator.

Aspect 37. The optical system according to aspect 36, wherein the portion of the light that is reflected towards the detection system is 5% or less of the incident light on the diffuser or 0.01-3% or 5% or less of the intensity or optical power of the incident light beam or 0.01-3%.

Aspect 38. The optical system according to any of the aspects 22 to 37, wherein the detection system is a photo-sensor, a linear array of photo-sensors or an array of N columns and M lines of photo-sensors.

Aspect 39. The optical system according to aspect 38, wherein the photo-sensor(s) are photodiode(s), photo-resistor(s), phototransistor(s) or similar.

Aspect 40. The optical system according to any of the aspects 22 to 39, wherein the detection system comprises a pair of light sensors.

Aspect 41. The optical system according to any of aspects 22 to 40, wherein the aperture is filled with light and all rays of light that exit the diffusor with the same angle end up at the same point in the aperture.

Aspect 42. The optical system according to of any of aspects 22 to 41, wherein the anomaly is detected as a change in FWHM.

Aspect 43. The optical system according to any of the aspects 22 to 42, configured to image the diffuser onto the transmissive or reflective spatial light modulator and is configured to be bi-telecentric.

Aspect 44. The optical system according to any of the aspects 22 to 43, wherein the optical system is minimally configured to be object space telecentric.

Aspect 45 relates to a method of monitoring a state of a diffuser illuminated by a coherent light source, at least one light beam comprising at least one bundle of rays of light exiting the diffuser being for illumination of a transmissive or reflective spatial light modulator of a projector, further comprising sampling the light beam exiting the diffuser and re-directing the light beam sample towards a detection system, wherein the detection system is coupled to an analyzer that generates a signal when an anomaly is detected in the distribution of the light intensity in a cross-section of the sample of the light beam.

Aspect 46. The method according to aspect 45, wherein the detection system comprises one or more detectors, the one or more detectors being coupled to the analyzer that generates the signal when an anomaly is detected in the distribution of the light intensity in a cross-section of the sample of the light beam.

Aspect 47. The method according to aspect 45 or 46, wherein the step of sampling comprises sampling a light distribution in an aperture in an aperture plane.

Aspect 48. The method according to aspect 45 or 46 or 47, wherein the signal is an alarm signal.

Aspect 49. The method according to any of the aspects 45 to 47, wherein the transmissive or reflective spatial light modulator is a DMD or an LCOS or a light valve of the projector.

Aspect 50. The method according to any of the aspects 45 to 49, wherein the cross section is an attenuated copy of the cross section of a light beam in the aperture, and/or the detection system is configured to evaluate the distribution of light in an exit pupil of the projection lens.

Aspect 51. The method according to any of the aspects 45 to 50, wherein the sampler is positioned between an exit surface of the diffuser and the transmissive or reflective spatial light modulator.

Aspect 52. The method according to any of the aspects 45 to 51, wherein the anomaly is an intensity difference between a peripheral position and the center of the bundle of rays which indicates a damaged/failing diffuser.

Aspect 53. The method according to any of the aspects 45 to 52, wherein the sampler is a semi-transparent mirror whereby a majority of light incident on the sampler is transmitted towards the reflective or transmissive spatial light modulator.

Aspect 54. The method according to aspect 53, wherein the portion of the light that is reflected towards the detection system is 5% or less of the incident light on the diffuser or 0.01-3% or 5% or less of the intensity or optical power of the incident light beam or 0.01-3%.

Aspect 55. The method according to any of the aspects 46 to 54, wherein the detector is a photo-sensor, a linear array of photo-sensors or an array of N columns and M lines of photo-sensors.

Aspect 56. The method according to aspect 55, wherein the photo-sensor(s) are photodiode(s), photoresistor(s), phototransistor(s) or similar.

Aspect 57. The method according to any of the aspects 46 to 56, wherein the detector is a pair of light sensors.

Aspect 58. The method according to any of the aspects 46 to 57, wherein the aperture is filled with light and all rays of light that exit the diffusor with the same angle end up at the same point in the aperture.

Aspect 59. The method of any of the aspects 45 to 58, wherein the anomaly is detected as an FWHM change.

Aspect 60. The method according to any of the aspects 45 to 59, configured to image the diffuser onto the spatial light modulator and configured to be bi-telecentric.

Aspect 61. The method according to any of the aspects 45 to 60, minimally configured to be object space telecentric.

Aspect 62. A method of operating an image projection device comprising the method of any of the aspects 45 to 61.

Aspect 63 relates to a method according to operating a transmissive or reflective spatial light modulator of a projector, a depolarizer being installed at an aperture plane so that light transmitted to the transmissive or reflective spatial light modulator of the projector has no preferential polarization direction, the method comprising sampling the light beam exiting the diffuser and re-directing the light beam sample towards a detection system, wherein light that is sampled with the sampler before the depolarizer, has one polarization direction for a base illumination and an orthogonal polarization direction for steered highlight illumination, and a polarizer installed in the detection system is configured to block the base illumination while allowing the sampled highlight illumination to pass or vice versa.

Aspect 64. The method according to aspect 63, wherein the detection system comprises one or more detectors, the one or more detectors being coupled to an analyzer that generates a signal when an anomaly is detected in the distribution of the light intensity in a cross-section of the sample of the light beam.

Aspect 65. The method according to aspect 63 or 64, further comprising a 3D polarization switcher in front of a lens, wherein a base image to be projected and highlights of an image to be projected undergo equal transmission.

Aspect 66. The method according to any of the aspects 63 to 65, wherein, when shaped light and base light are combined based on their respective polarization, the shaped light and the base light are separated before the light reaches the detection system by using a polarizer positioned between the sampler and the detection system.

Aspect 67. The method according to aspect 66, wherein the majority of the light falling onto the detection system is highlights.

Aspect 68. The method according to aspect 66 or 67, wherein a residual leakage of base illumination is <20% of the highlight illumination.

Aspect 69. The method according to any of the aspects 63 to 68, wherein in the sampling step a light distribution in an aperture in an aperture plane is sampled.

Aspect 70. The method according to any of the aspects 63 to 69, further comprising a diffuser illuminated by at least one light beam from a coherent light source, the at least one light beam comprising at least one bundle of rays of light exiting the diffuser being for illumination of the transmissive or reflective spatial light modulator of the projector, wherein the detection system is coupled to an analyzer that generates a signal when an anomaly is detected in the distribution of the light intensity in a cross-section of the sample of the light beam.

Aspect 71. The method according to aspect 70, wherein the signal is an alarm signal.

Aspect 72. The method according to any of the aspects 63 to 71, wherein the transmissive or reflective spatial light modulator is a DMD or an LCOS or a light valve of the projector.

Aspect 73. The method according to any of the aspects 70 to 72, wherein the cross section is an attenuated copy of the cross section of a light beam in the aperture.

Aspect 74. The method according to any of the aspects 63 to 73, wherein the detection system is configured to evaluate the distribution of light in an exit pupil of the projector.

Aspect 75. The method according to any of the aspects 70 to 74, wherein the sampler is positioned between an exit surface of the diffuser and the transmissive or reflective spatial light modulator.

Aspect 76. The method according to any of the aspects 70 to 75, wherein the anomaly is an intensity difference between a peripheral position and the center of the bundle of rays which indicates a damaged/failing diffuser.

Aspect 77. The method according to any of the aspects 63 to 76, wherein the sampler is a semi-transparent mirror whereby a majority of light incident on the sampler is transmitted towards the reflective or transmissive spatial light modulator.

Aspect 78. The method according to aspect 77, wherein the portion of the light that is reflected towards the detection system is 5% or less of the incident light on the diffuser or 0.01-3% or 5% or less of the intensity or optical power of the incident light beam or 0.01-3%.

Aspect 79. The method according to any of the aspects 63 to 78, wherein the detection system is a photo-sensor, a linear array of photo-sensors or an array of N columns and M lines of photo-sensors.

Aspect 80. The method according to aspect 79, wherein the photo-sensor(s) are photodiode(s), photoresistor(s), phototransistor(s) or similar.

Aspect 81. The method according to any of the aspects 63 to 80, wherein the detection system comprises a pair of light sensors.

Aspect 82. The method according to any of aspects 63 to 81, wherein the aperture is filled with light and all rays of light that exit the diffusor with the same angle end up at the same point in the aperture.

Aspect 83. The method according to any of the aspects 63 to 82, wherein the anomaly is detected as an FWHM change.

Aspect 84. The method according to any of the aspects 63 to 83, configured to image the diffuser onto the transmissive or reflective spatial light modulator and is configured to be bi-telecentric.

Aspect 85. The method according to any of the aspects 63 to 84, being minimally configured to be object space telecentric.

Aspect 86. A method of operating an image projection device comprising the method of any of the aspects 63 to 85.

Aspects 87 and 88:

Methods according to the present invention can be performed by a computer system. The present invention can use a processing engine to carry out functions. The processing engine preferably has digital processing capability such as provided by one or more microprocessors, FPGA's, or a central processing unit (CPU) and/or a Graphics Processing Unit (GPU), and which is adapted to carry out the respective functions by being programmed with software, i.e. one or more computer programs. References to software can encompass any type of programs in any language executable directly or indirectly by a processor, either via a compiled or interpretative language. The implementation of any of the methods of the present invention can be performed by logic circuits, electronic hardware, processors or circuitry which can encompass any kind of logic or analog circuitry, integrated to any degree, and not limited to general purpose processors, digital signal processors, ASICs, FPGAs, discrete components or transistor logic gates and similar.

A processing device may have memory (such as non-transitory computer readable medium, RAM and/or ROM), an operating system, optionally a display such as a fixed format display, ports for data entry devices such as a keyboard, a pointer device such as a "mouse", serial or parallel ports to communicate other devices, network cards and connections to connect to any of the networks.

The software can be embodied in a computer program product adapted to carry out the functions of any of the methods of the present invention when the software is loaded onto a computer and executed on one or more processing engines such as microprocessors, ASIC's, FPGA's etc. Hence, any of the embodiments of the present invention can incorporate a computer system capable of running one or more computer applications in the form of computer software.

The methods described with respect to embodiments of the present invention above can be performed by one or more computer application programs running on the computer system by being loaded into a memory and run on or in association with an operating system such as Windows™ supplied by Microsoft Corp, USA, Linux, Android or similar. The computer system can include a main memory, preferably random-access memory (RAM), and may also include a non-transitory hard disk drive and/or a removable non-transitory memory, and/or a non-transitory solid-state memory. Non-transitory removable memory can be an optical disk such as a compact disc (CD-ROM or DVD-ROM), a magnetic tape, which is read by and written to by a suitable reader. The removable non-transitory memory can be a computer readable medium having stored therein computer software and/or data. The non-volatile storage memory can be used to store persistent information that should not be lost if the computer system is powered down. The application programs may use and store information in the non-volatile memory.

The software embodied in the computer program product is adapted to carry out the functions disclosed in a method of any of the aspects 45 to 86 when the software is loaded onto the respective device or devices and executed on one or more processing engines such as microprocessors, ASIC's, FPGA's etc.

Any of the above software may be implemented as a computer program product which has been compiled for a processing engine in any of the servers or nodes of the network. The computer program product may be stored on a non-transitory signal storage medium such as an optical disk (CD-ROM or DVD-ROM), a digital magnetic tape, a magnetic disk, a solid-state memory such as a USB flash memory, a ROM, etc.

Accordingly, aspect 87 relates to a computer program product comprising a computer program which, when executed on a processor, executes the method of any of the aspects 45 to 86 and aspect 88 relates to a signal storage means storing the computer program of aspect 87.

DETAILED DESCRIPTION OF ILLUSTRATIVE EMBODIMENTS

In FIGS. 2A, 2B, 2C, 2E, 2G and 5 the same reference numerals or characters have the same meaning as the same numerals or characters when used in these figures.

First Embodiment

FIG. 2 (2A to 2H) shows an example of an apparatus that can monitor the state of a diffusor illuminated by a light beam and in particular a coherent light beam such as a laser, in accordance with an embodiment of the present invention.

This embodiment also includes a method comprising the step of monitoring the state of a diffusor illuminated by a light beam and in particular a coherent light beam such as a laser. The apparatus or method can be used as a diffusor failure detection apparatus or method respectively. The apparatus or the method can be used in a projector.

Figure 2A:
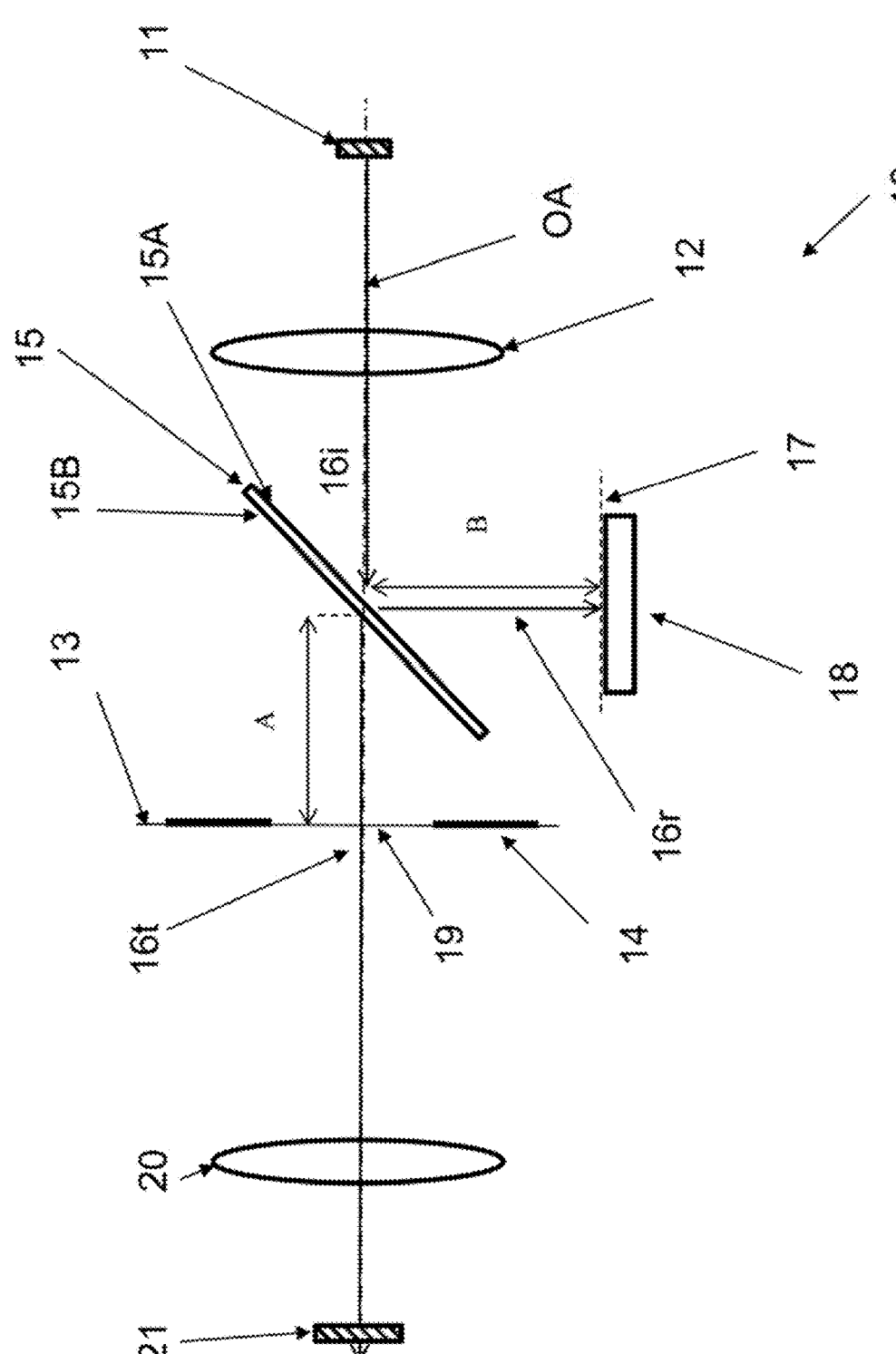
FIG. 2A shows a first example of embodiment of the present invention.

The apparatus or the method comprises or makes use of a sampler that samples the light beam exiting the diffusor and re-directs it towards a detection apparatus. The apparatus can include a means for redirecting the sampled beam to the detection apparatus. The detection apparatus can comprise or include one or more detectors. The one or more detectors can include photosensors, photodiodes, photoresistors, phototransistors or similar and drive electronics to monitor these photosensors. The drive electronics or the method is configured to detect changes in the sampled light beam and to output a signal, such as an alarm signal, when the changes in the light beam indicate a damaged or failing diffusor. Following detection of a change indicating a damaged or failing diffusor, the method or the drive electronics may be configured also to reduce the intensity of a laser light source, or to block or to deflect the light beam such as a laser light beam or turn off the light beam such as the laser light beam. The detection apparatus can be an integral part of a projector or it can be an optical assembly or a retro-fit apparatus for a projector. In FIG. 2A, an example of an optical system, which is a diffusor failure detection apparatus 10, is shown where a diffusor 11 is imaged by a set of lenses 12 and 20 onto an amplitude modulator such as a reflective or transmissive spatial light modulator such as a DMD, and LCOS or a light valve 21 such as an LCD; with an aperture plane 13 and aperture stop 14 with an aperture 19 provided, for example, after the first lens 12. In particular, the diffuser 11 can be a stationary or moving diffusor. A moving diffusor is preferred to avoid that the structure of the diffuser material becomes visible in the projected image, for example. In between the lens 12 and the aperture stop 14, a sampler, for example in the form of a sampling plate 15, is configured to couple out a small fraction 16r of the light 16i incident on the sampler such as plate 15. The fraction of light 16r can be, for example, 5% or less of the incident light 16i, for example 0.01-3% and in particular 5% or less and at least 0.01% of the intensity or optical power of the light beam 16i, for example 0.01-3%. The reflected light 16r goes to a detector system 18. The transmitted light 16t goes on towards the aperture plane 13 through the aperture 19 and beyond via a second lens 20 to illuminate a reflective or transmissive spatial light modulator such as a DMD or an LCOS or a light valve 21 of a projector. The sampler such as plate 15 can, for instance, be a glass plate. An anti-reflection coating (not shown) can be present on one or both sides 15A and 15B of the sampler, e.g. the glass plate 15, to reduce the transmission losses. The residual reflection can, for instance, be higher than 0.01% and is preferably lower than 1% to 5%. At a distance equivalent to the optical path length between the sampler, i.e. the sampling plate 15 and the aperture plane 13, the sampled aperture plane 17 can be found (i.e. optical distance A=optical distance B). The optical distance A is taken on the optical axis OA which corresponds to a central light ray. The optical distance B is taken along the reflection 16r of the central ray on the sampler, such as the sampling plate 15.

The light distribution in a cross section of aperture 19 in aperture plane 13 of the light beam 16t will be substantially the same as the light distribution in a cross section of the reflected light beam 16r of the sampled aperture plane 17.

Figure 2B:
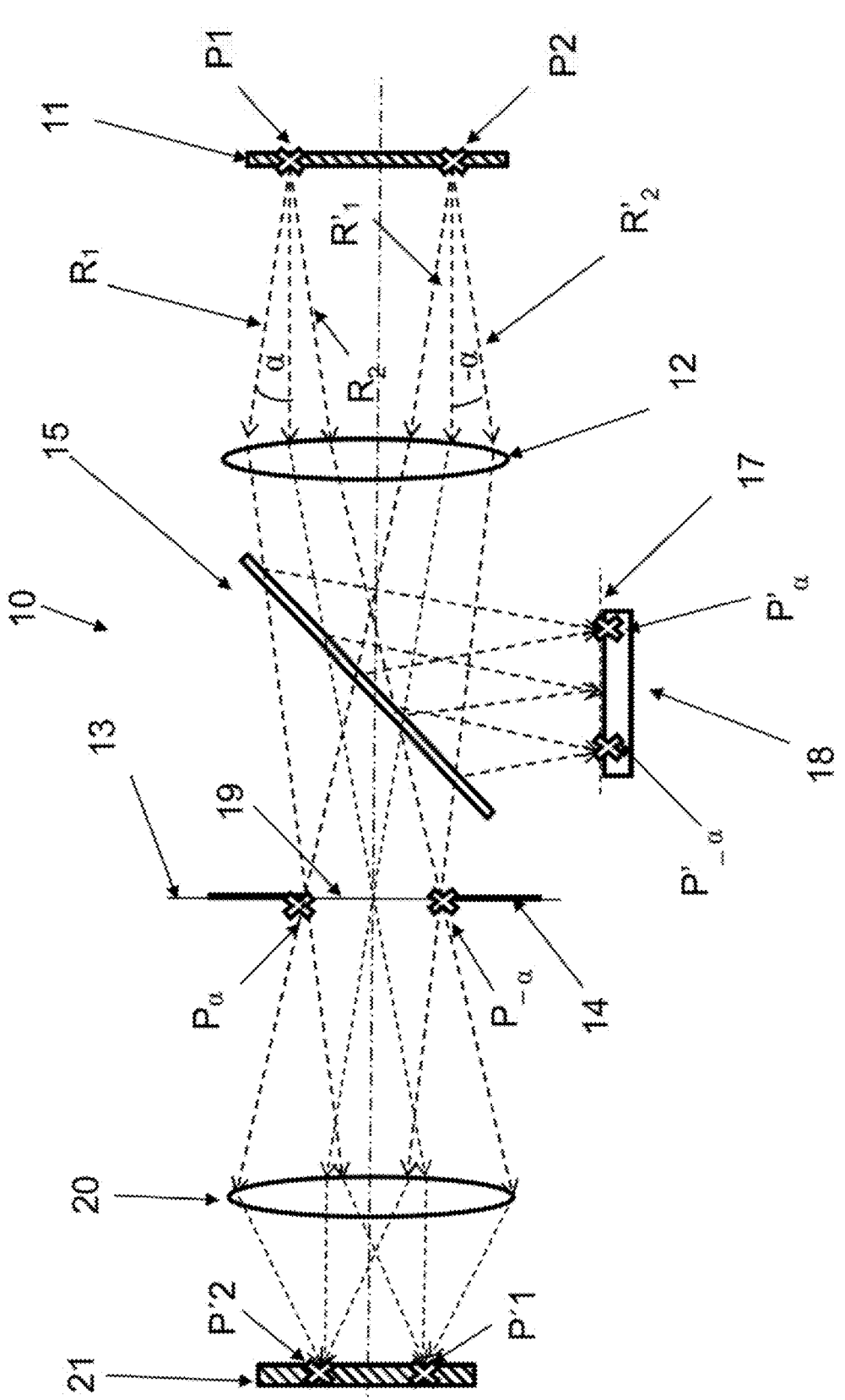
FIG. 2B details the path of different light rays exiting the surface of the diffusor in FIG. 2A.

How the light exiting the diffusor 11 is distributed across the aperture 19 of the aperture stop 14 in the aperture plane 13, is illustrated in FIG. 2B. In between the lens 12 and the aperture stop 14, a sampler, for example in the form of a sampling plate 15, is configured to couple out a small fraction of the light incident on the sampler such as plate 15. The fraction of light reflected can be e.g. 5% or less of the incident light, e.g. 0.01-3% and in particular 5% or less and at least 0.10% of the intensity or optical power of the incident light beam 16i, for example 0.01-3%. The reflected light 16r goes to a detector system 18. The transmitted light 16t goes on towards the aperture plane 13 and beyond via a second lens 20 to illuminate a reflective or transmissive spatial light modulator such as a DMD or an LCOS or a light valve 21 of a projector. The sampler such as plate 15 can, for instance, be a glass plate. An anti-reflection coating (not shown) can be present on one or both sides of the sampler e.g. the glass plate 15 to reduce the transmission losses. The residual reflection 16r can, for instance, be higher than 0.01% and is preferably lower than 1% to 5%. At a second distance equivalent to a first distance being the optical path length between the sampler, i.e. the sampling plate 15 and the aperture plane 13, the sampled aperture plane 17 can be found. Hence, the first optical distance is taken on the optical axis which corresponds to a central light ray. The second optical distance is taken along the reflection 16r of the central ray on the sampler such as the sampling plate 15.

The diffuser 11 can be a stationary or moving diffusor. A moving diffusor is preferred to avoid that the structure of the diffuser material becomes visible in the projected image, for example.

The optical system that images the diffuser 11 onto the reflective or transmissive spatial light amplitude modulator such as the DMD or LCOS or the light valve 21 preferably is configured to be bi-telecentric in any of the embodiments of the present invention. For the detection system 18 to work as intended, it is preferred if the optical system should minimally be configured to be substantially object space telecentric in any of the embodiments of the present invention. Light rays that exit the diffuser 11 parallel to the optical axis are focused by lens 12 in the center of the aperture 19 of the aperture stop 14.

Applicable to any of the embodiments of the present invention, FIG. 2B shows how different rays of light exiting the diffuser 11 from either position P1 or P2, (which can be anywhere else on the surface of the diffuser 11) with the same angle α to the optical axis, will intersect each other at the same point in the aperture 19 of the aperture stop 14.

For instance, a ray of light $R_1$ exiting the diffuser 11 at a point P1 with an angle α to the optical path will arrive at the point $P_α$ in the aperture 19 of the aperture plane 13.

A ray of light $R'_1$ exiting the diffuser 11 at a point P2 (which can be anywhere else on the surface of the diffuser 11) with an angle α to the optical path will arrive at the same point $P_α$ in the aperture plane 13.

A ray of light $R_2$ exiting the diffuser 11 at a point P1 with an angle −α to the optical path will arrive at the point $P_{-α}$ in the aperture plane 13.

A ray of light $R'_2$ exiting the diffuser 11 at a point P2 (which can be anywhere else on the surface of the diffuser 11) with an angle −α to the optical axis will arrive at the same point $P_{-α}$ in the aperture plane 13.

In general, rays of light $R_θ$ exiting the diffuser 11 with the same angle θ with respect to the optical path will arrive at the same point $P_θ$ in the aperture plane 13.

Some of the light rays $R_\theta$ will be reflected by the sampler such as the sampling plate 15. Those light rays will end up at the same point in the sampled aperture plane 17. For instance, all the light rays that exit the diffuser 11 with an angle $\alpha$ to the optical axis (regardless of the position on the surface of the diffuser 11) and that are reflected on the sampler such as the sampling plate 15 will arrive at the same point $P'_\alpha$ in the sampled aperture plane 17. All the light rays that exit the diffuser 11 with an angle $-\alpha$ to the optical axis (regardless of the position on the surface of the diffuser 11) and that are reflected on the sampler such as the sampling plate 15 will arrive at the same point $P'_{-\alpha}$ in the sampled aperture plane 17.

Therefore, as long as the diffuser 11 is intact and regardless of the light distribution at the input of the diffuser 11:

The distribution of light across the (opening 19 of the) aperture stop 14 remains unchanged The distribution of reflected light across the sampled aperture plane 17 is an image of the distribution of light across the (opening 19 of the) aperture stop 14 and, therefore, remains unchanged as well.

Light that is transmitted through the sampler 15 and passes through aperture 19 will be imaged onto the reflective or transmissive spatial light amplitude modulator such as the DMD or LCOS or the light valve 21 by means of the lens or group of lenses 20. The diffuser position P1 will be imaged onto position P'1 at the spatial light amplitude modulator 21 and the diffuser position P2 will be imaged onto position P'2 at the same spatial light amplitude modulator 21. Other optical components can be inserted in the optical path in between the lens group 20 and the spatial light amplitude modulator 21, for example a color combining/splitting prism and/or a TIR prism. These components are omitted from the drawing for reasons of clarity.

Figure 2C:
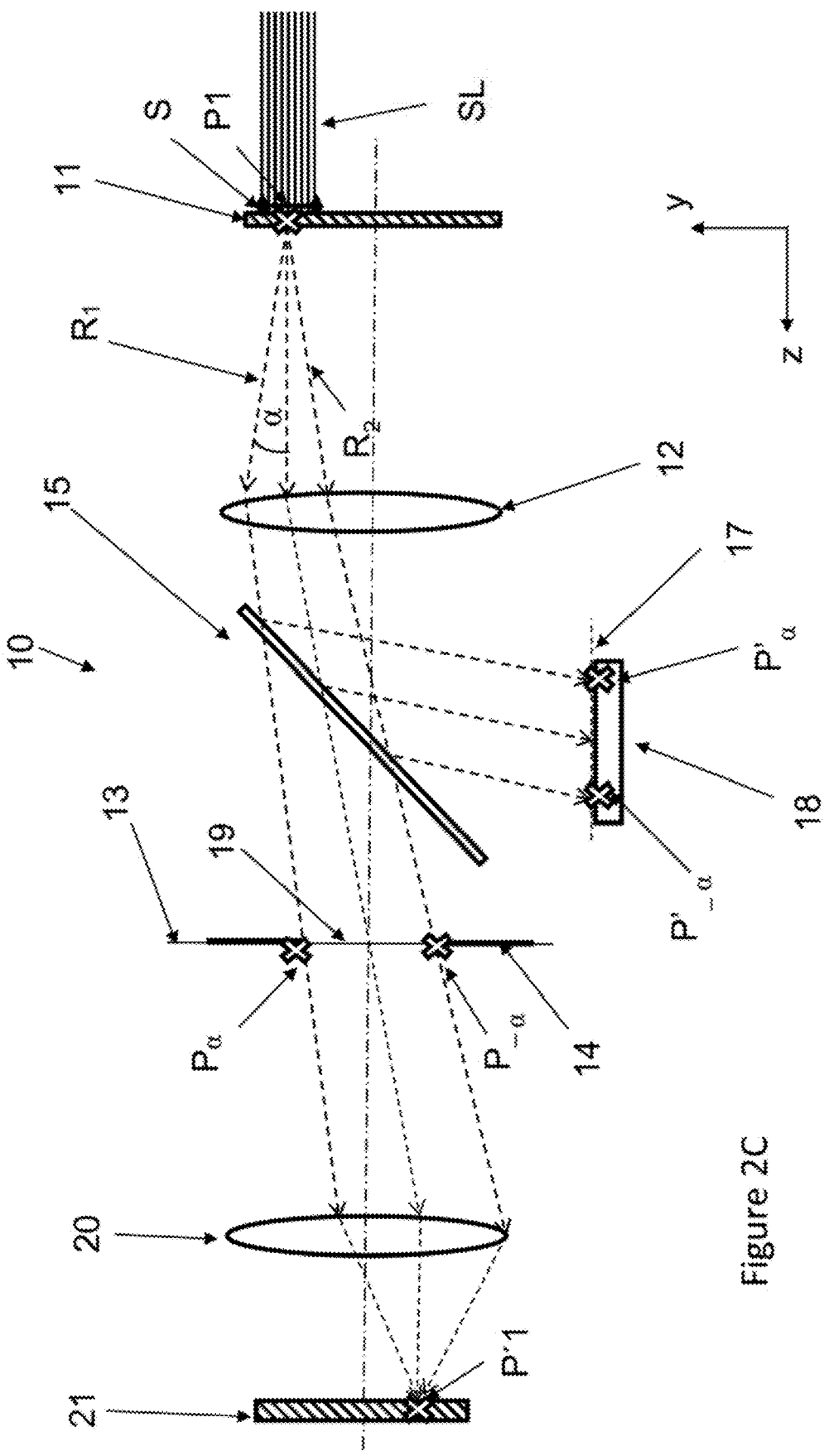
FIG. 2C illustrates how light rays originating form a point P1 of an intact diffuser are distributed across the aperture plane and the sampled aperture plane according to an embodiment of the present invention.
Figure 2D:
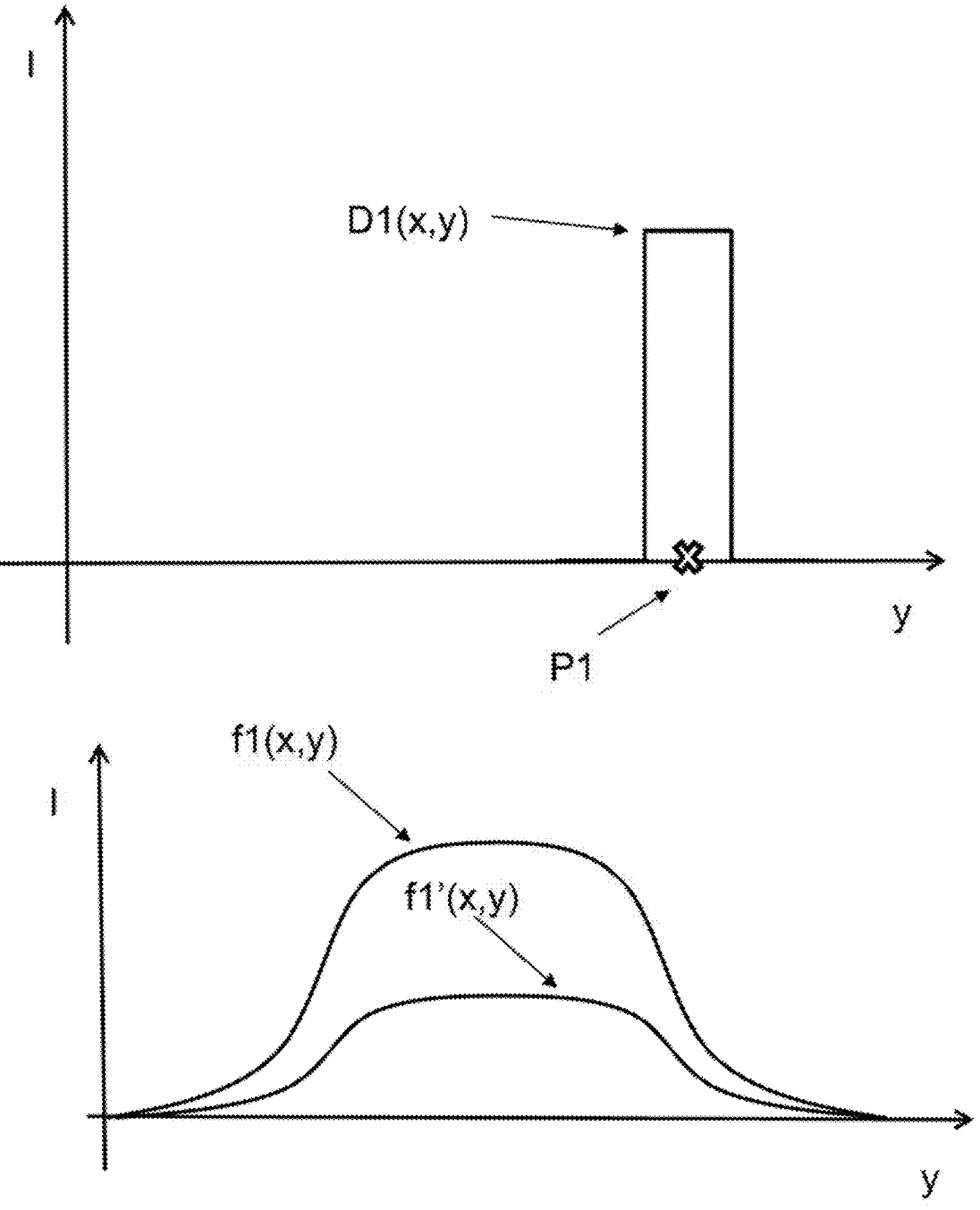
FIG. 2D shows an example of distribution of light intensity $D1(x,y)$ across the input surface of the diffuser and of the light intensity $f1(x,y)$ across the (opening of the) aperture stop and of the distribution of light $f1'(x,y)$ across the sampled aperture plane corresponding to FIG. 2C according to an embodiment of the present invention.
Figure 2E:
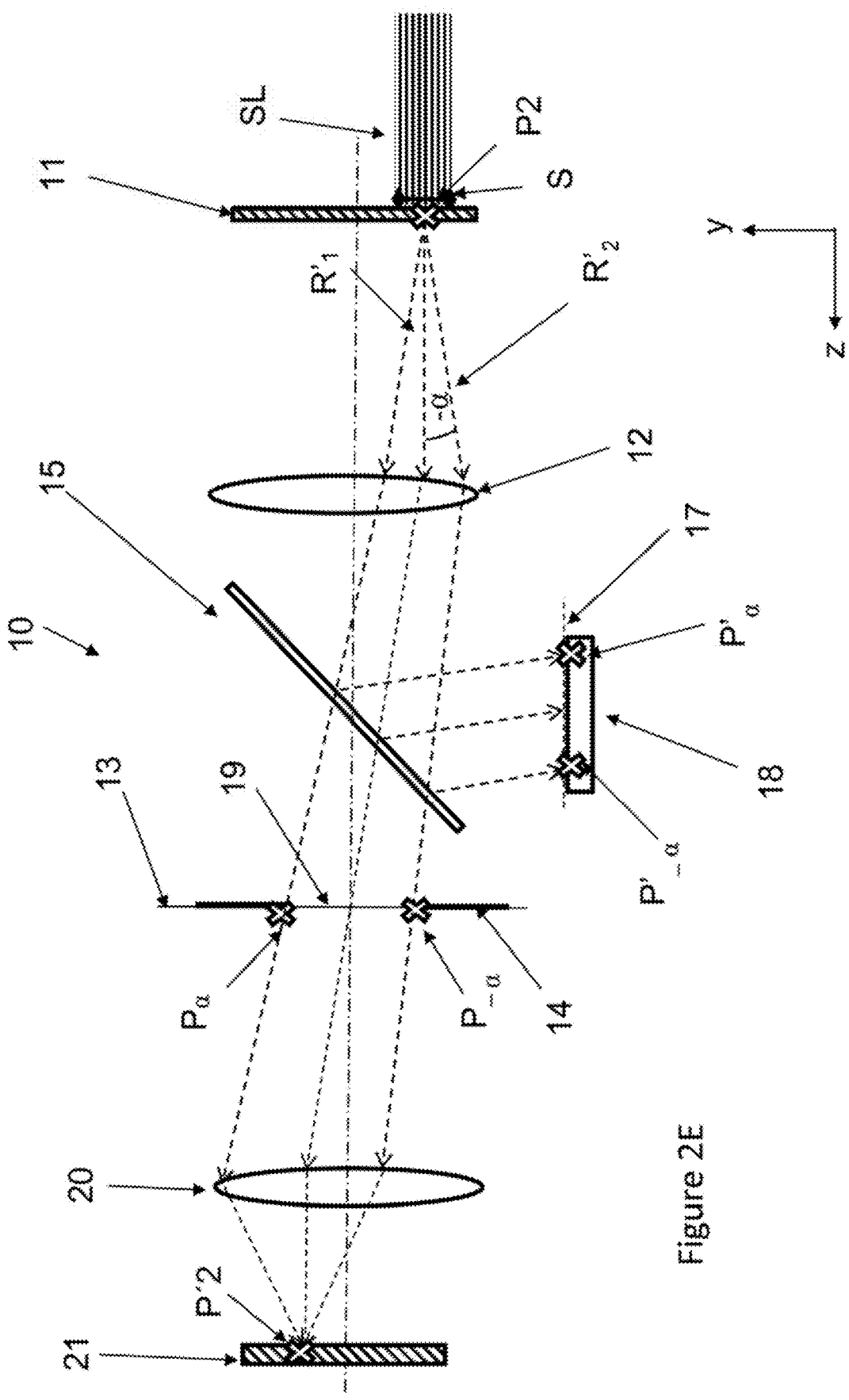
FIG. 2E illustrates how light rays originating form a point P2 of an intact diffuser are distributed across the aperture plane and the sample aperture plane according to an embodiment of the present invention.
Figure 2F:
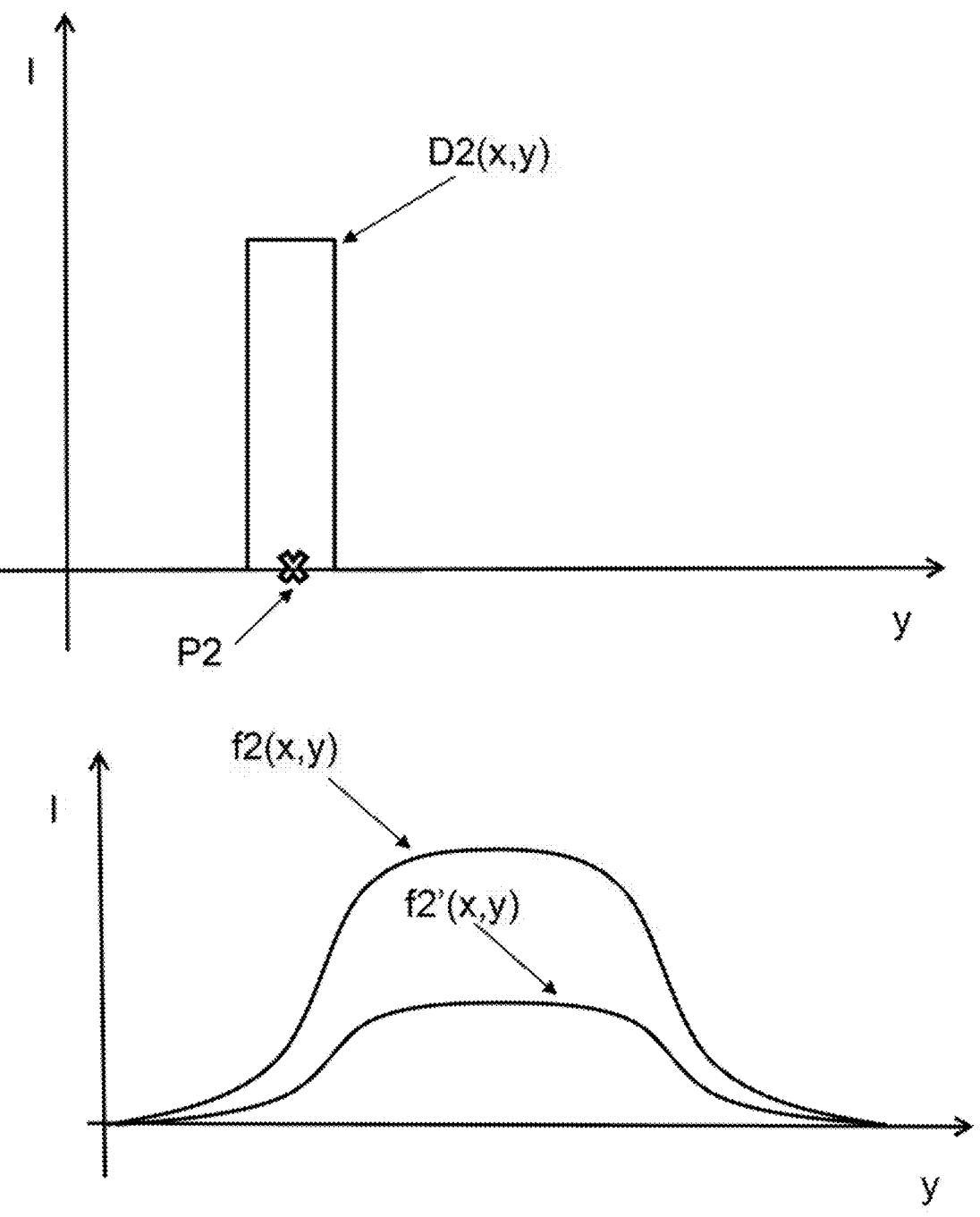
FIG. 2F shows an example of distribution of light intensity $D2(x,y)$ across the input surface of the diffuser, of the distribution of light $f2(x,y)$ across the (opening of the) aperture stop and of the distribution of light $f2'(x,y)$ across the sampled aperture plane corresponding to FIG. 2E according to an embodiment of the present invention.
Figure 2G:
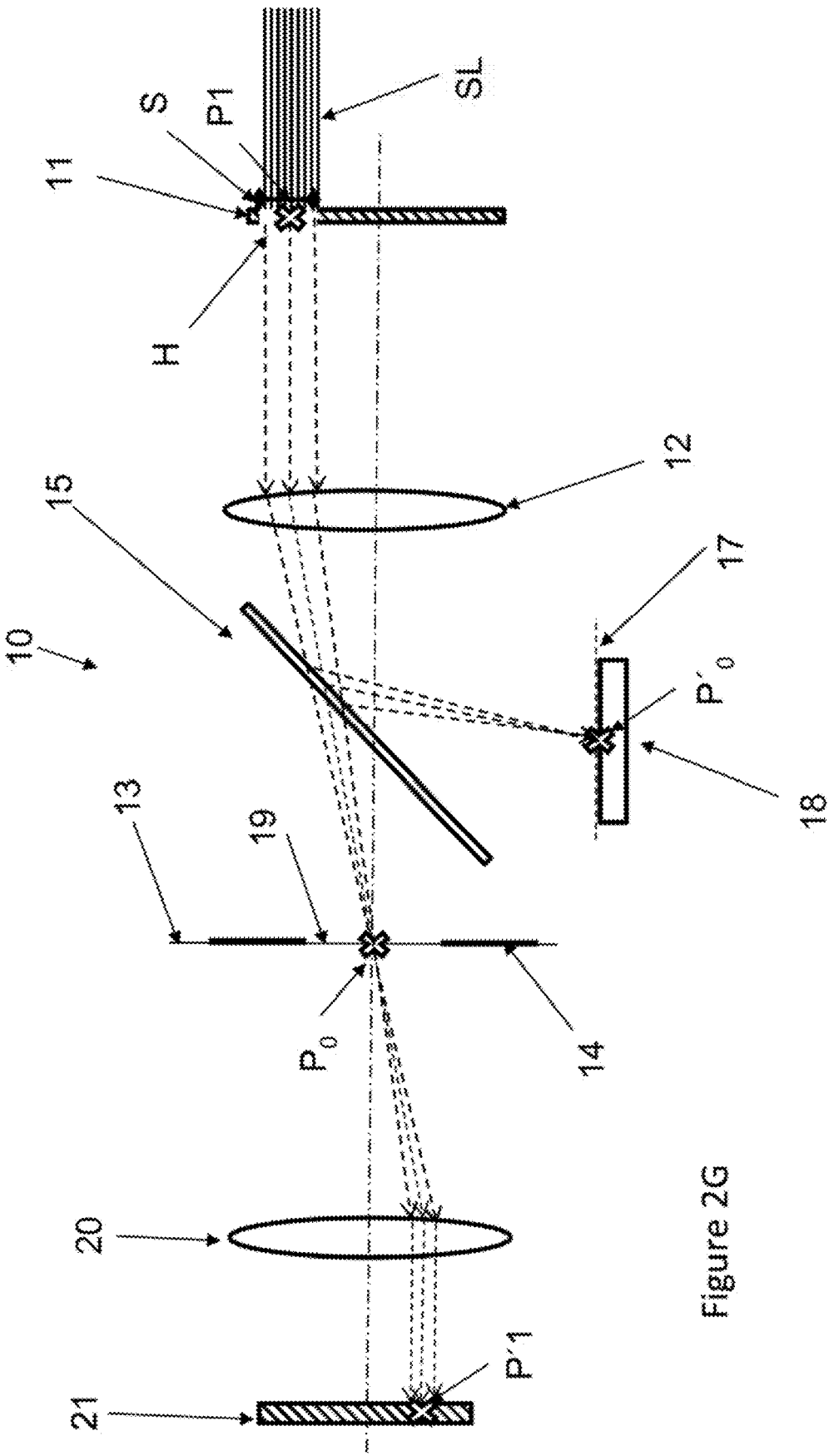
FIG. 2G details the path of rays of light exiting a damaged diffuser according to an embodiment of the present invention.

This is illustrated on FIGS. 2C, 2E and 2G. In FIGS. 2A, 2B, 2C, 2E, 2G and 5 reference numerals or characters have the same meaning as the same numerals or characters in FIG. 2B.

FIG. 2C shows in between the lens 12 and the aperture stop 14, a sampler e.g. in the form of a sampling plate 15 is configured to couple out a small fraction of the light incident on the sampler such as plate 15. The fraction of light reflected can be, for example, 5% or less of the incident light, for example 0.01-3% and in particular 5% or less of the intensity or optical power of the light beam 16*i*, for example 0.01-3%. The reflected light goes to a detector system 18. The transmitted light goes on towards the aperture plane 13 and beyond via a second lens 20 to illuminate a reflective or transmissive spatial light modulator such as a DMD or an LCOS or a light valve 21 of a projector. The sampler, such as plate 15, can, for instance, be a glass plate. An anti-reflection coating (not shown) can be present on one or both sides of the sampler, for example the glass plate 15, to reduce the transmission losses. The residual reflection can, for instance, be higher than 0.01% and is preferably lower than 1% to 5%. At a second distance equivalent to a first distance being the optical path length between the sampler, i.e. the sampling plate 15 and the aperture plane 13, the sampled aperture plane 17 can be found. Hence, the first optical distance is taken on the optical axis which corresponds to a central light ray. The second optical distance is taken along the reflection 16*r* of the central ray on the sampler such as the sampling plate 15.

The diffuser 11 can be a stationary or moving diffusor. A moving diffusor is preferred to avoid that the structure of the diffuser material becomes visible in the projected image, for example.

The optical system that images the diffuser 11 onto the reflective or transmissive spatial light amplitude modulator such as the DMD or LCOS or the light valve 21 preferably is configured to be bi-telecentric. For the detection system 18 to work as intended, it is preferred if the optical system should minimally be configured to be substantially object space telecentric. Light rays that exit the diffuser 11 parallel to the optical axis are focused by lens 12 in the center of the aperture stop 14.

In FIG. 2C, shaped light SL illuminates a surface S of area dA of the diffuser 11 around a first point P1. S can be, for example, a disc centered on P1. The distribution D(x,y) of light across the disc can be arbitrary. For the sake of simplicity, we take as an example a top hat distribution across the surface S. The rays of light that exit the diffuser 11 will fill the (opening 19 of the) aperture stop 14 and the image of the aperture stop 14 in the sampled aperture plane 17 as was described earlier.

FIG. 2C shows how different rays of light exiting the diffuser 11 with the same angle $\alpha$ to the optical path will intersect each other at the same point in the aperture 19 of the aperture stop 14.

For instance, a ray of light $R_1$ exiting the diffuser 11 at a point P1 within the surface S with an angle $\alpha$ to the optical path will arrive at the point $P_\alpha$ in the aperture 19 of the aperture plane 13.

A ray of light $R_2$ exiting the diffuser 11 at the point P1 within surface S with an angle $-\alpha$ to the optical path will arrive at the point $P_{-\alpha}$ in the aperture plane 13.

In general, rays of light $R_\theta$ exiting the diffuser 11 within surface S with the same angle $\theta$ to the optical path will arrive at the same point $P\theta$ in the aperture plane 13.

Some of the light rays $R_\theta$ will be reflected by the sampler such as the sampling plate 15. Those light rays will end up at the same point in the sampled aperture plane 17. For instance, all the light rays that exit the diffuser 11 with an angle $\alpha$ to the optical path (regardless of the position on the surface S of the diffuser 11) and that are reflected on the sampler such as the sampling plate 15 will arrive at the same point $P'_\alpha$ in the sampled aperture plane 17. All the light rays that exit the diffuser 11 with an angle $-\alpha$ to the optical path (regardless of the position on the surface S of the diffuser 11) and that are reflected on the sampler such as the sampling plate 15 will arrive at the same point $P'_{-\alpha}$ in the sampled aperture plane 17.

The light intensity D1(x,y) across the input surface of the diffuser 11, the light intensity f1(x,y) across the (opening 19 of the) aperture stop 14 and the light intensity f1'(x,y) across the sampled aperture plane 17 are shown on FIG. 2D. For the sake of simplicity, we only give the light intensity along a single direction (e.g. y, the direction y and z are in the plane of FIG. 2C and the direction x is perpendicular with the plane of FIG. 2C).

FIG. 2E shows a diffusor failure detection apparatus 10 as in FIG. 2C. In FIG. 2E, shaped light illuminates a surface S of area dA around a second point P2 different from P1 that is shown in FIG. 2C, with the same light across the surface S around P2 as it was the case in FIG. 2C around the first point P1.

The light intensity D2(x,y) across the input surface of the diffuser 11, the distribution of light f2(x,y) across the (opening 19 of the) aperture stop 14 and the distribution of light f2'(x,y) across the sampled aperture plane 17 are shown on FIG. 2F.

In both cases, regardless of the surfaces located around point P1 or P2 around which the diffusor 11 is illuminated, the distribution of light rays in the opening 19 of the aperture stop 14 (f1 and f2) and across the sampled aperture plane 17 (f1' and f2') is the same.

Summarising the above, in any of the embodiments described above, a diffusor failure detection apparatus 10, for example in a light steered projector, provided that the optics that image the moving diffuser 11 onto the reflective or transmissive spatial light amplitude modulator such as a DMD or an LCOS or the light valve 21, such as an LCD, are object space telecentric, the light distribution across the aperture stop 14 and across the sampled aperture plane 17 is independent of the actual light shaping. Note that it is preferred if shaping of the light has no effect on the angle at which the light is incident on the diffuser 11. In practice, this incident angle can be somewhat affected by the light steering this will be discussed further. This effect is small enough however, such that the light distribution across the opening 19 of the aperture stop 14 and across the sampled aperture plane 17 is effectively largely independent from the actual light shaping.

In FIG. 2G, another diffusor failure detection apparatus 10 is shown similar to the one in FIGS. 2C and 2E and having the same optical components. The diffusor 11 is damaged at P1. For the sake of simplicity, we take a hole H with a surface S (e.g. a disc with area dA and centered on P1) as an example of a defect or damage. If shaped light illuminates the surface S, the rays of light exit the diffuser 11 without having been diffused as they go through the hole H. Since all the rays of light exit the surface of the diffuser 11 with an angle of 0°, the rays of light not reflected by the sampling plate 15 will end up at the same point $P_0$ in the center of the opening of the aperture stop 14. The rays of light reflected by the sampling plate 15 will end up at the same point $P'_0$ in the center of the opening of the sampled aperture plane 17.

Figure 2H:
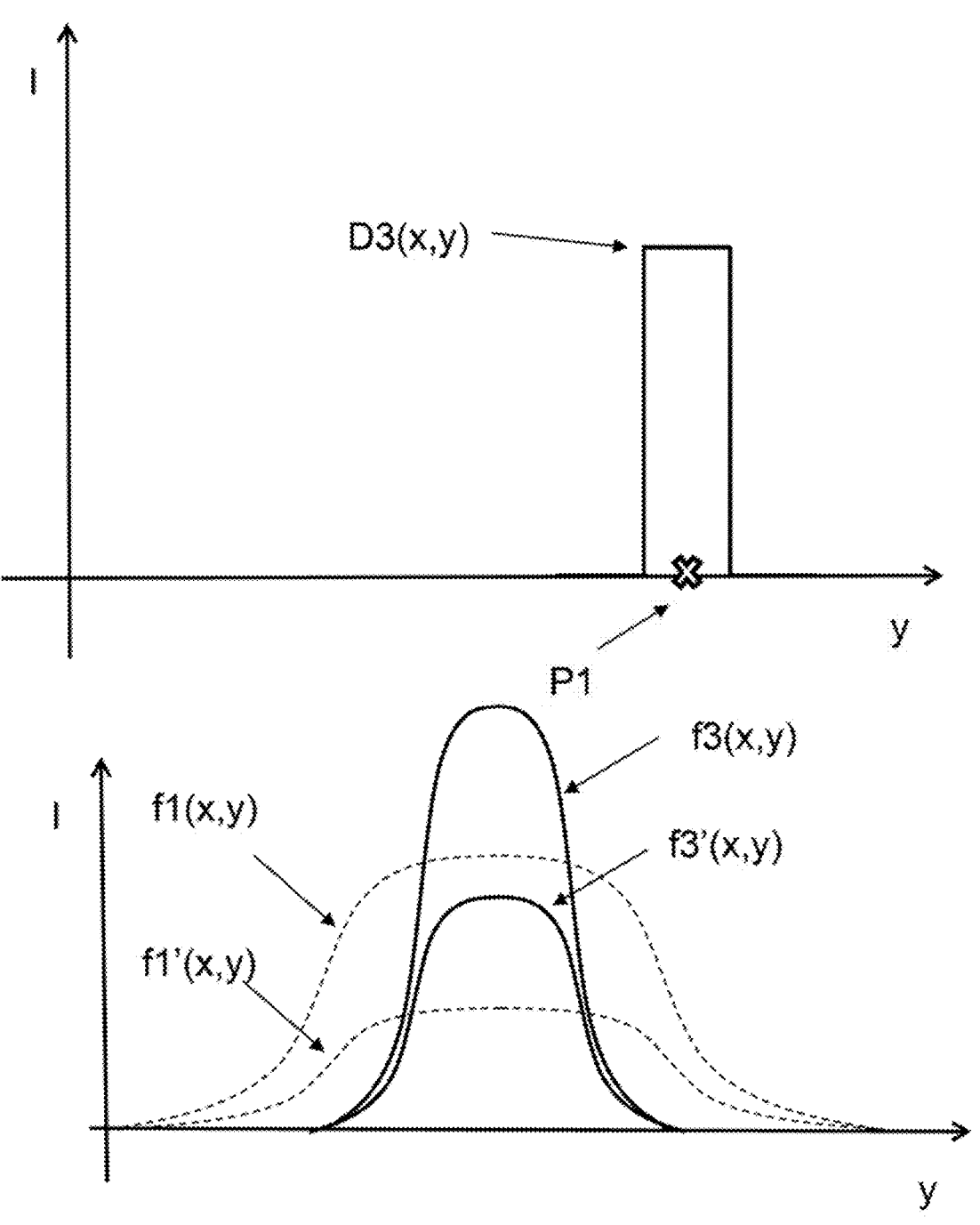
FIG. 2H shows an example of distribution of light intensity $D3(x,y)$ across the input surface of the diffuser, of the distribution of light $f3(x,y)$ across the (opening of the) aperture stop and of the distribution of light $f3'(x,y)$ across the sampled aperture plane corresponding to FIG. 2E according to an embodiment of the present invention.

FIG. 2H shows how the light intensity D3(x,y) varies across the input surface of the diffuser 11, across the opening 19 of the aperture stop 14 and across the sampled aperture plane 17. While D3 in FIG. 2H and D1 in FIG. 2D are identical, the profile of the light intensity across the opening 19 of the aperture stop 14 f3(x,y) and across the sampled aperture plane 17 f'3(x,y) are very different from those on FIG. 2D. The light distributions with the damaged diffuser f3(x,y) and f'3(x,y) have a much higher peak intensity and a more narrow FWHM than the light distributions with the undamaged diffuser f1(x,y) and f'1(x,y) illustrated in dotted lines in FIG. 2H.

The sampler such as the sampling plate 15 reflects a fraction of the light rays. The reflected light rays will intersect each other in the sampled aperture plane 17, i.e. light rays, that exit the diffuser 11 with the same angle α and that are reflected by the sampler such as the sampling plate 15, will intersect at the same point in the sampled aperture plane 17.

Damage to the diffuser 11 will be visible as a change in light distribution in the aperture plane 13 and in the sampled aperture plane 17. For example, there can be a change in FWHM. A change can be detected by a detector system 18 which may include photosensors, photodiodes, photoresistors, phototransistors or similar and drive electronics to monitor these photosensors. The drive electronics can be configured to detect changes in the sampled light beam (such as a change in FWHM) and to output a signal such as an alarm signal when the changes in the light beam indicate a damaged or failing diffusor 11. The drive electronics may also react to receipt of the output signal of the diffusor failure detection apparatus 10 by reducing the intensity of a laser light from the laser light source, or blocking or deflecting the light beam from the laser light source or turning off the light source. Bright zones in the aperture plane 14 do not correspond to a region on the transmissive or reflective amplitude modulator 21 such as a DMD or a light valve like an LCD of the projector or on screen. Points P1 and P2 are imaged on a different position on the transmissive or reflective amplitude modulator 21 such as a DMD or an LCOS or a light valve like an LCD of a projector but deliver the same intensity profile in the aperture plane 13.

A crack or hole in the diffusor 11 will often result in an increase in light intensity close to the center of the aperture 19 of aperture stop 14 or more generally at, or close to, the point P0 of the aperture stop 14 where rays of lights exiting the diffusor 11 with an angle of 0° are directed by the lens 12.

Upon detection of one or more changes in the distribution of the light intensity in the sampled aperture plane 17, the drive electronics can output a signal such as an alarm signal or the laser light from the laser light source can be blocked, reduced in intensity, deflected or the light source shut down and highlighting may be reduced or closed down.

In a projection system where the total light flux through the aperture plane 13 and the sampled aperture plane 17 is constant, the detector 18 can be a single photodetector. A hole in the diffusor 11 will result in an increase of the light intensity at $P'_0$ as illustrated on FIG. 2G. A single photodetector at that position can detect an increase in light intensity.

However, in a practical light steering projector the total light flux through the system might not be constant. Besides effects like changing output from the light source with time and temperature, the light throughput efficiency of a light steering system can also vary with the light steering pattern targeted. For example, steering towards the center of the image can be more efficient than steering towards the corners. Moreover, in order to improve black levels, it can be desirable to dim the light source such as a laser light source, or steer light such as laser light away and outside of the active image area (and, for example, dump it on a heat sink) when the light budget required by the image is limited. In these cases, the total light flux varies depending on the video signal applied to the light steered projector. In light steering projectors where the light flux is not constant, a threshold of detection for a single photodetector can be prone to a false negative detection when the signal from the photodetector always remains below threshold even if the diffusor 11 is not working properly.

Another disadvantage of the single photodetector system is that a false positive signal could be generated when the percentage of light to be outcoupled by the sampler, such as the sampling plate 15, increases, for example due to temperature effects.

In a more preferred embodiment, the detector 18 can be an array of photodetectors with 2 or more photodetectors. The detection system can be configured to evaluate the relative intensity distribution between the different photodetectors. If the distribution changes or is non-uniform, a signal can be generated such as an alarm signal. Alternatively, the output of the light source can be reduced or blocked or deflected or the light source can be shut down. The detector system may include an array of photosensors, photodiodes, photoresistors, phototransistors or similar and drive electronics to monitor these photosensors. The diffusor failure detection apparatus 10 and/or its drive electronics can be configured to detect changes in the sampled light beam and to output a signal such as an alarm signal when the changes in the light beam indicate a damaged or failing diffusor 11. The drive electronics may also reduce the intensity of a laser light source, or block or deflect the light beam or shut down the light source. The array can be linear (i.e. 2 or more photodetectors distributed over a straight line) or a 2D array (with 3 or more photodetectors distributed in a plane). The array can be regular (i.e. the photodetectors are positioned at regular intervals) or not.

The position of the photodetectors can take advantage of symmetries present in the system. For instance, the light distribution (when the diffusor 11 is intact) can be symmetrical around the optical axis of the system. In that case, the photodetectors can be distributed along a line perpendicular with and intersecting the optical axis. Also, only two photodetectors of photosensors which only monitor two positions of the light beam, respectively, are sufficient. The two positions may be a central position for a first photodetector and a peripheral position for a second photodetector or photosensor.

Further Embodiment

Figure 3A:
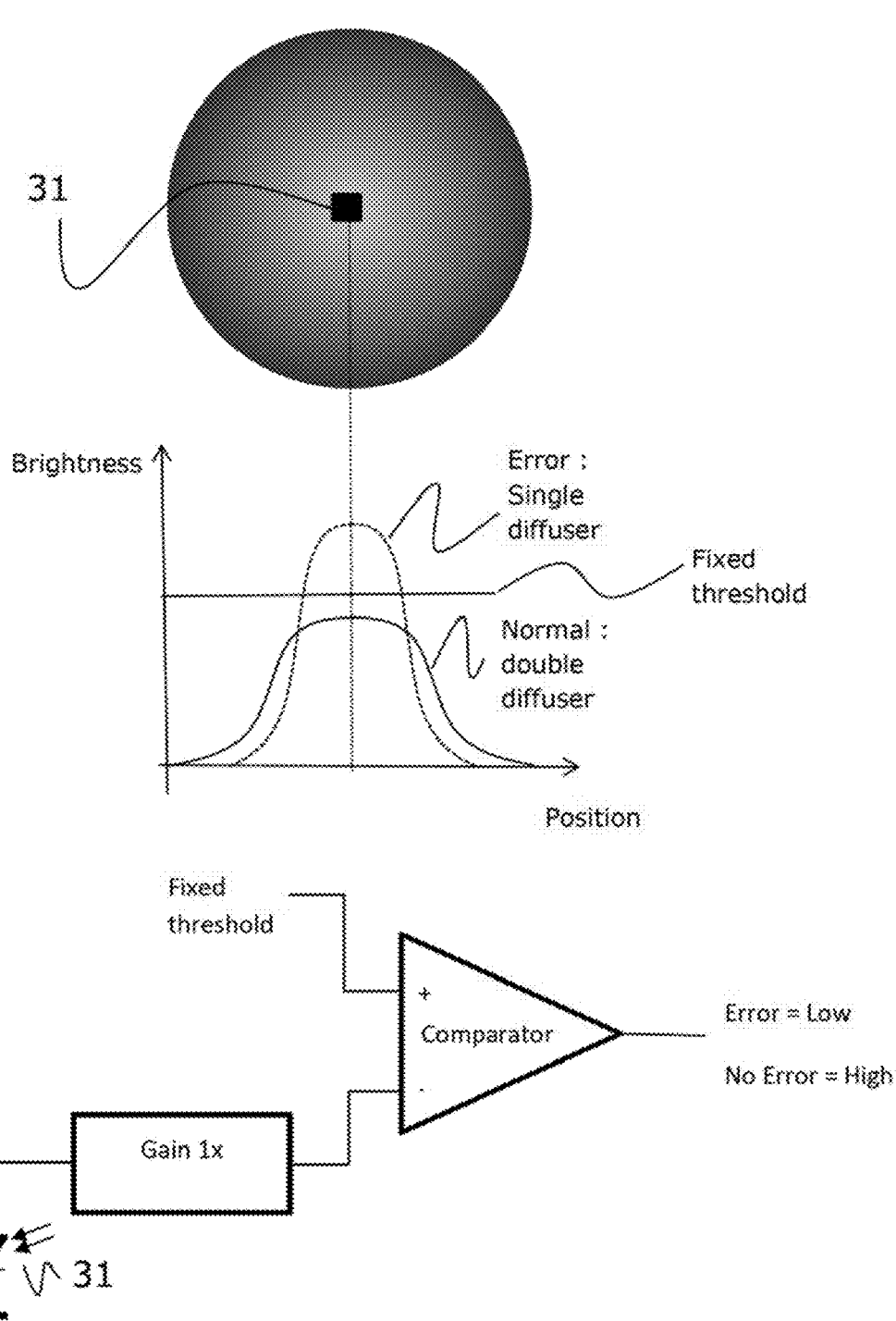
FIG. 3A shows an example brightness distribution across the sampled aperture plane and the position of a central photosensor according to an embodiment of the present invention.
Figure 3B:
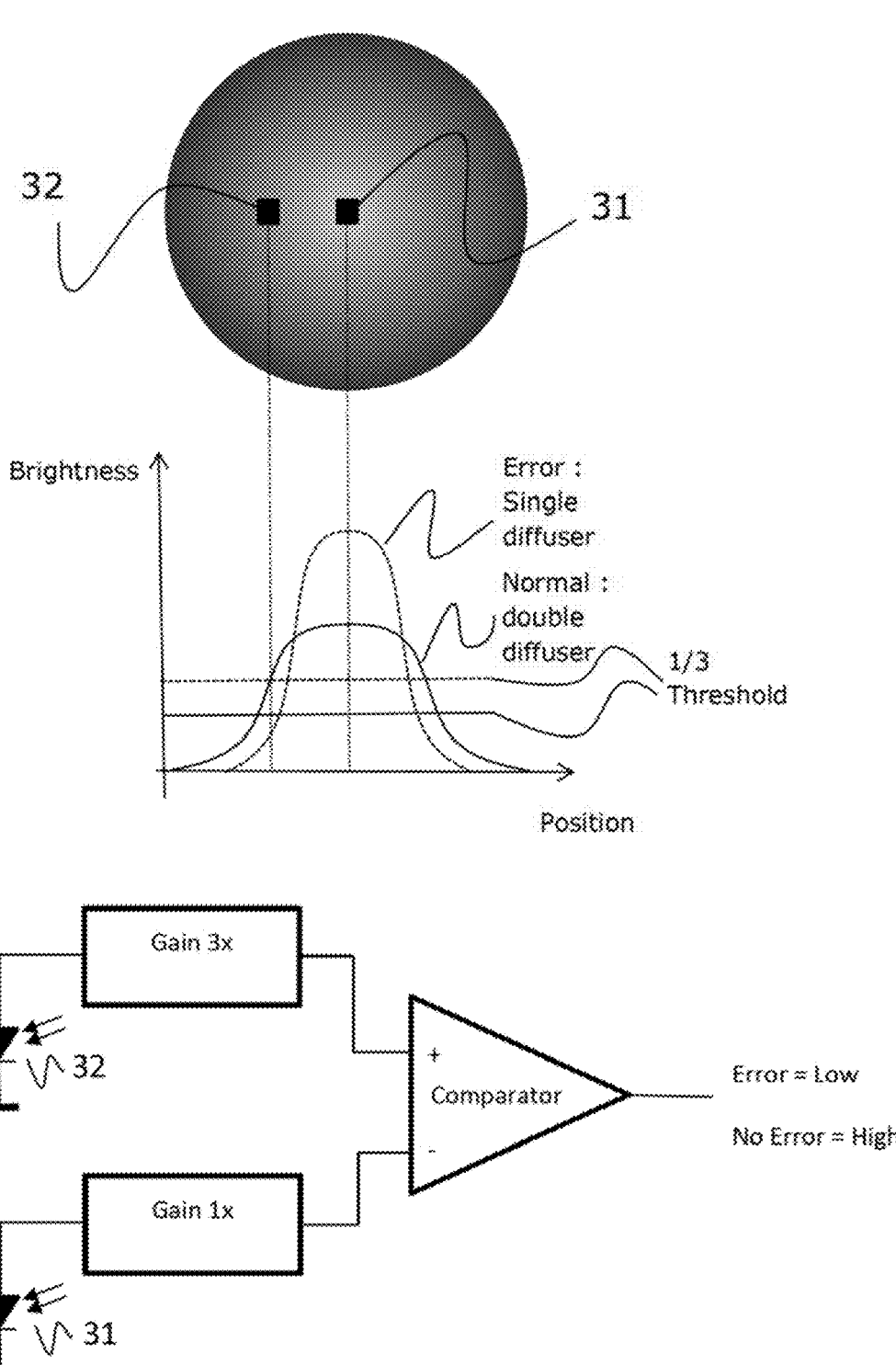
FIG. 3B shows an example brightness distribution across the sampled aperture plane and the positioning of a first central photosensor and a second off-center photosensor according to an embodiment of the present invention.
Figure 3C:
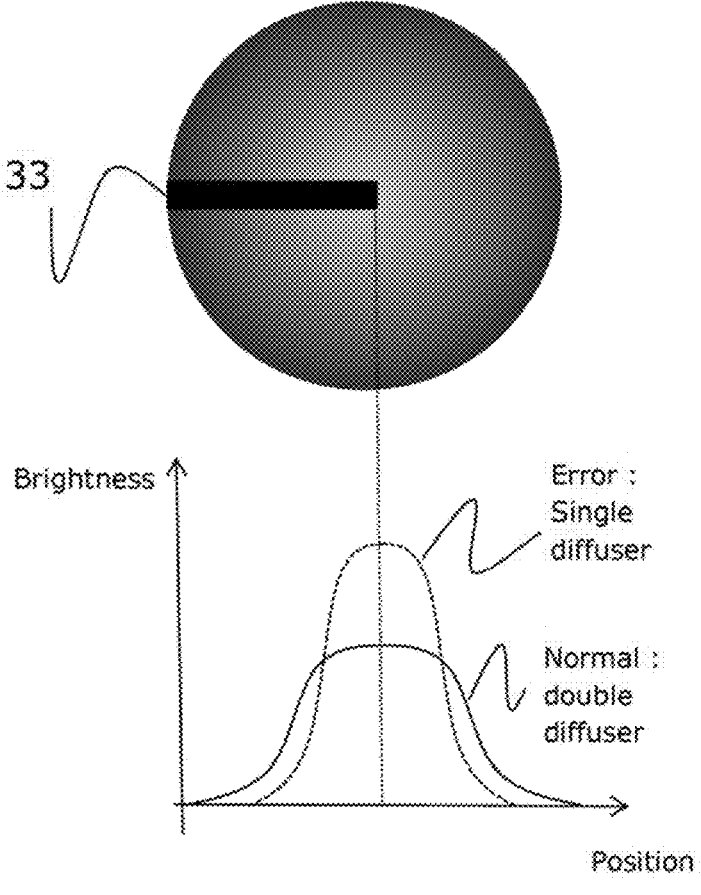
FIG. 3C shows an example brightness distribution across the sampled aperture plane and the positioning of a line multi-photosensor according to an embodiment of the present invention.

FIGS. 3A, 3B and 3C illustrate alternative dispositions of photo-sensors like, for example, photodiodes, photoresistors, phototransistors or similar of detector 18 in the sampled aperture plane 17. The photo-sensors can be part of any of the diffusor failure detection apparatus 10 as shown in any of FIGS. 2A, 2B, 2C, 2E, 2G and 5.

In FIG. 3A, a photosensor 31 is positioned at the center of the intensity profile. The photosensor 31 can be a photodiode, photoresistor, phototransistor or similar and drive electronics to monitor this photosensor. To detect a diffuser failure, a comparator circuit can be provided that compares the value of the light intensity given by the photosensor 31 with a fixed threshold.

In FIG. 3B, a first photosensor 31 is positioned at the center of the intensity profile and a second photosensor 32 is positioned at e.g. half the maximum radius $R_{Max}$ of the intensity profile. The photosensor 31 and/or 32 can be a photodiode, photoresistor, phototransistor or similar and drive electronics to monitor these photosensors. To detect a diffuser failure, a comparator circuit can be provided that compares the value of the light intensity given by the second photosensor 32 with a fraction (e.g. ⅓) of the value of the light intensity output by the first photosensor 31 or compares n times (e.g. n=3) the value of the light intensity given by the second photosensor 32 with the value of the light intensity output by the first photosensor 31.

In FIG. 3C, a line sensor with multiple photosensor elements 33 is positioned to extend from the center of the intensity profile to the edge of the intensity profile. The multiple photosensor elements can include photodiodes, photoresistors, phototransistors or similar and drive electronics to monitor these photosensors.

As was described previously, damage to the diffusor 11 will result in a change of the light intensity profile in the sampled aperture plane 17. For instance, if two or at least two photodetectors are used, the ratio of the light intensity at the position of the first sensor and of the light intensity at the position of the second sensor will change in function of the state of the diffusor. In normal operation, the brightness in the center of the aperture is higher then the brightness at the edge of the aperture. When the diffuser breaks, the brightness in the center of the aperture will become even higher while the brightness at the edge of the aperture will drop. It is preferred in all embodiments that a ratio of the outputs of two photodetectors or photosensors is used to determine that a diffusor is defective. If the ratio is the center brightness compared to aperture edge or peripheral brightness, then the ratio will increase in case of an anomaly of the diffusor. If the ratio is defined as edge or peripheral brightness over center brightness then this ratio will decrease if there is an anomaly in the diffuser.

Measurement or calculation of a ratio between measurements of light intensity by two photodetectors or photosensors has the advantage over absolute measurements that re-calibration of values which indicate a defect is not required. Using a ratio of intensities to indicate a defect is more robust than absolute measurements to changes such as dimming or highlighting applied to a projected image or other changes of the power used by the projector.

As explained above, the anomaly can be detected as an increase or by a decrease in this ratio. It is much preferred if only two photodetectors or photosensors are used to detect the anomaly whether by decrease or increase in intensity ratio between a peripheral position and a central position of the at least one bundle of rays or wherein the anomaly is detected as a change in FWHM.

Alternatively, more than two detectors can be used.

The diffusor failure detection apparatus 10 and/or the drive electronics can be configured to detect changes in the sampled light beam and to output a signal such as an alarm signal when the changes in the light beam indicate a damaged or failing diffusor. The diffusor failure detection apparatus 10 or the drive electronics may also reduce the intensity of laser light from a laser light source, or block or deflect the light beam or shut down the laser light source.

With the diffusor failure detection apparatus 10 more than one diffusor can be used. With a single photosensor 31 in the center to determine the peak brightness level and a second photosensor 32 at a position in the aperture corresponding to angles of e.g. 6°, the ratio between the brightness at the first photosensor 31 and the brightness at the position of the second photosensor 32 is significantly different when one of the diffusers fails. All that is required for the drive electronics to detect failure, is a comparator circuit that compares the value of the light intensity given by the second photosensor 32 with a fraction (e.g. ⅓) of the value of the light intensity output by the first photosensor 31 or compares n times (e.g. n=3) the value of the light intensity given by the second photosensor 32 with the value of the light intensity output by the first photosensor 31. Calculation or measurement of a ratio between measurements of light intensity by two photodetectors or photosensors has the advantage over absolute measurements that re-calibration of the values which indicate a defect in a diffusor is not required. Using a ratio of intensities to indicate a defect is more robust than absolute measurements to changes such as dimming or highlighting applied to a projected image or other changes of the power used by the projector.

The central position corresponds to 0° at the aperture. However, angle deviations can be generated in the order of +/−3.5°. In an optical system with only a single diffuser, it is preferred if the area of the central position, which is monitored by a first photodetector or photosensor, is configured to capture the entire range of angular deviations (e.g. +/−3.5°) in both horizontal and vertical directions.

The second peripheral photodetector or photosensor preferably monitors outside this range of angles, e.g. >4°, preferably >5° more preferably 6° or larger. The maximum angle can be defined by the F-number of the optical system which may be 10.5 degrees, for example. An angle range which keeps the monitoring of light intensity at the peripheral position by the second photodetector or photosensor away from the angular range monitored by the first photodetector or photosensor at the central position can be selected to be 4° to 8° or 3° to 9°, typically 6°.

In a normal situation with both diffusers 11 working, the output of the second photosensor 32 will be higher than e.g. ⅓ of the center value. If the diffuser 11 fails, the brightness at an angle (e.g. 6°, 4° to 8° or 3° to 9°) will stay roughly the same while the center brightness increases and the second photosensor 32 will measure below ⅓ of the first photosensor 31. The change or decrease in ratio between the value measured at the peripheral position to that at the central position will be registered as the presence of an anomaly in the diffusor, thereby causing the output of the comparator circuit to flip. This output signal can be used as an alarm signal or to trigger a reduction in light intensity or to shut down the laser light source or to block, divert or reduce its power. The same holds true when the comparator circuit compares n times (e.g. n=3) the value of the light intensity given by the second photosensor 32 with the value of the light intensity output by the first photosensor 31. The big advantage of the two photosensor method compared to the single central sensing method is that detection is not affected by the total light flux through the aperture plane 17 as it relies on relative measures to determine the shape of the light intensity distribution.

Because the sampler, such as the sampling plate 15, has a certain thickness, a double image may exist in the sampled aperture plane 17 of any of the embodiments of the present invention. A reflection from the front side 15A of the sampler, such as the sampling plate 15, can overlay with a reflection 15B from the backside of the sampler, such as the sampling plate 15. However, this offset will be relatively small and the image in the sampled aperture plane 17 is still adequate, for example for systems with low resolution detection. Low resolution detection means, for example, that the detector 18 has a lower resolution than the transmissive or reflective amplitude modulator, such as a DMD, or a light valve 21, like an LCD, of a projector (e.g. LC panel or micro-mirror device) illuminated by the transmitted light 16$t$ or that detection of a problem does not require the same resolution as that of the transmissive or reflective amplitude modulator 21, such as a DMD, or a light valve, like an LCD, of a projector, when analyzing the light distribution across the sampled aperture plane 17.

Figure 4:
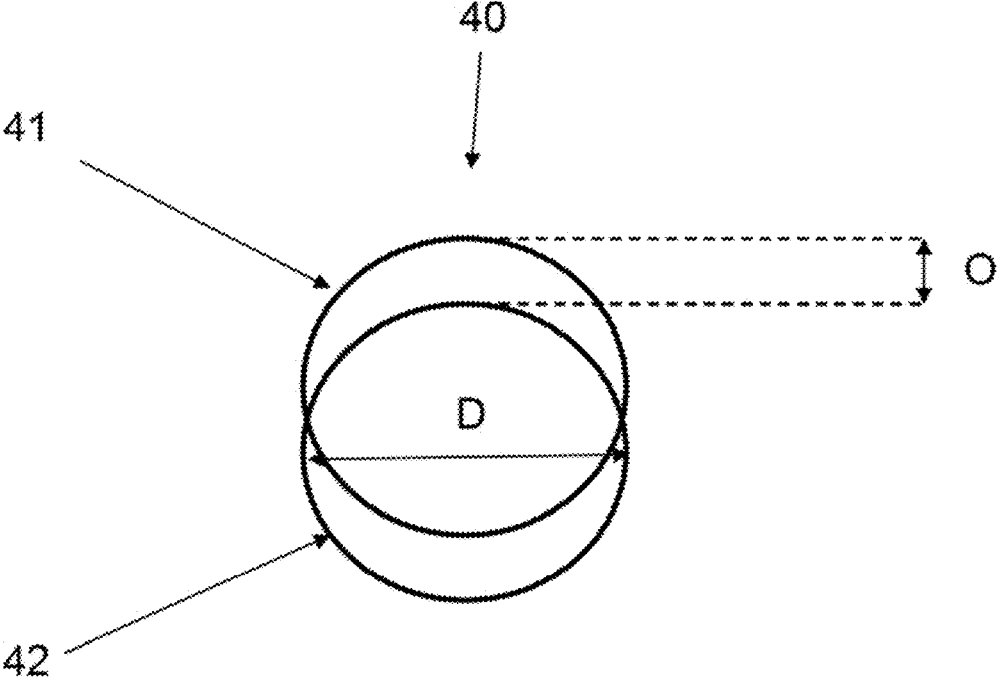
FIG. 4 illustrates the offset between the images reflected by the sampling plate according to an embodiment of the present invention.

The sampler can be a glass plate 15 and can, for instance, be 1 mm thick. With a typical angle of 45° between the optical axis OA and the sampler, such as the sampling plate 15, the reflections on both sides of the sampler, such as the sampling plate 15 (which can be a glass plate), will be offset by √2 mm. This must be compared to the size of the aperture 19 of the aperture stop 14 which has a typical diameter of 20 mm to 50 mm. FIG. 4 illustrates this.

The image 40 in the sampled aperture plane 17 comprises a first image 41 obtained by reflection of the light on the first surface 15A of the sampler, such as the sampling plate 15, and a second image 42 obtained by reflection of light on the second surface 15B of the sampler, such as the sampling plate 15. The offset O separates corresponding points of the images 41 and 42 as illustrated on FIG. 4. Offset O is small compared to diameter D.

If the line sensor is positioned perpendicular to the offset direction (e.g. along the horizontal direction on FIG. 4), then the thickness of the sampler, such as the glass plate 15, is less critical. If the line sensor is positioned in the same direction as the offset, then a sampler, such as the glass plate 15, of 5 mm thick would create an offset of the same order of magnitude as the distance between two photodetectors of the detector array 18 and the detection could or would no longer work optimally. To mitigate the problem of the double reflection, in particular when the photodetectors are distributed along a direction parallel to the offset direction, two alternative embodiments are of particular interest:

In a first alternative, an Anti-Reflection (AR) coating is provided on a single side of the sampler such as the sampling plate 15. The reflection on the side of the sampler such as the sampling plate 15 without AR coating becomes dominant.

In a second alternative, the sampler, such as the sampling plate 15, is very thick (e.g. more than 10 mm) such that the imaged reflections are separated in the sampling aperture plane 17. The detector 18 is positioned so as to see only one of the reflections. The thickness of the sampler, such as the sampling plate 15, is determined in function of the width of the incident light beam, the distance between photodetectors in the detector array 18 and the angle between the sampler, such as the sampling plate 15, and the optical axis OA.

Embodiment: Separate Base Light and Highlight=Shaped Light

In a hybrid projector, a steered illumination (e.g. steering light to a pattern of varying light intensity) is combined with a conventional uniform base illumination, for example as in a conventional projector. The steered illumination can function to provide highlighting, i.e. illumination can be steered to parts of a projected image to provide highlights while the other parts (with low and medium intensity) of the image itself are projected by a base illumination, for example using conventional projection. By concentrating light in steered directions, highlights in an image can be projected and displayed without dumping light. The highlights are shaped lights. The total light flux of the base illumination profile can be higher than the total light flux of the steered illumination profile. For example, 30% steered light flux versus 70% base light flux.

Figure 5:
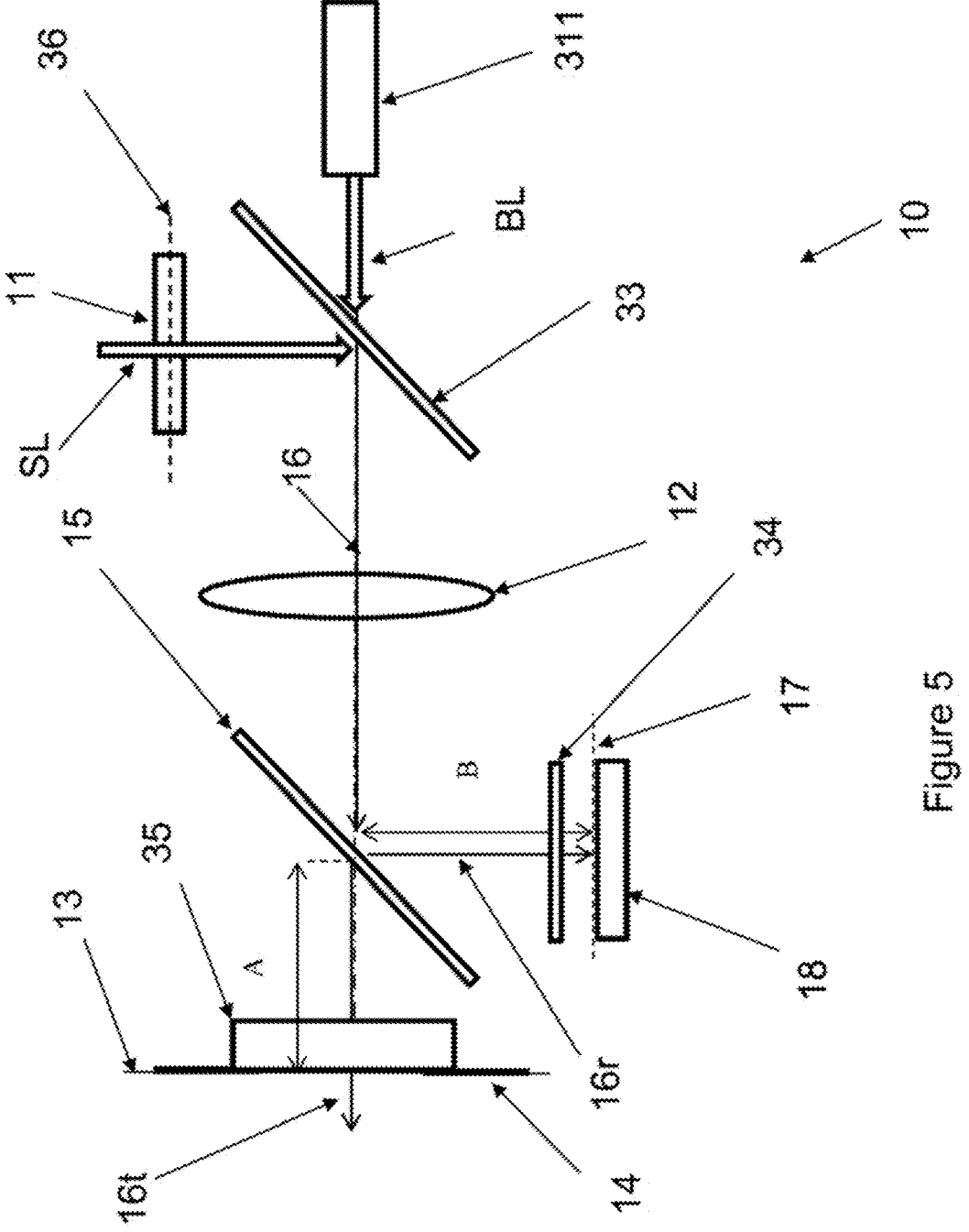
FIG. 5 shows how the principles of embodiments of the present invention can be adapted for use in a hybrid projector.

FIG. 5 illustrates a further diffusor failure detection apparatus 10. FIG. 5 shows how the relay optics 12 illustrated on any of FIG. 2A, 2B, 2C, 2E or 2G can be adapted for use in a hybrid projector. The base light BL is emitted from a conventional projector illumination system, such as an integrator 311. Shaped light SL is received from a light shaper (not shown). In the example of FIG. 5, the shaped light SL and the base light BL are polarized. The directions of polarization of the shaped light SL and the base light BL are orthogonal. Both light beams can be combined with a polarized beam combiner 33. The combined beam 16 goes through relay optics 12. As was the case in any of FIG. 2A, 2B, 2C, 2E or 2G, a transmitted fraction 16$t$ of the beam 16 passes through the sampler 15 (e.g. a glass plate) and moves on towards the aperture 14. A reflected fraction 16$r$ (e.g. less than 5%) of the beam 16 is reflected by the sampler 15 towards the detector 18.

The detection of a failure of a diffuser 11 in the diffuser plane 36 can be done on the combined light beams of the shaped light (SL) and the base light (BL).

In some cases, it may be necessary to isolate the shaped light SL from the base light BL before it reaches the detector 18. This can be the case if, for example, it becomes difficult to detect variability in the light distribution caused by a failure of diffusor 11 with a particular detector system 18 (i.e. because the output of the detectors is dominated by the light flux of the base light).

When the shaped light SL and the base light BL are combined based on their polarization, it is possible to separate the shaped light and the base light right before it reaches the detector 18 by using a polarizer 34 positioned between the sampling plate 15 and the detector 18. Then, the majority of the light falling onto the detector 18 is coming from the highlight path. A small residual leakage of base illumination can be tolerated as long as it is significantly weaker than the highlight illumination (for example <20% of the highlight illumination).

A depolarizer 35 can be installed at the aperture plane 13, to make sure that the light transmitted to the transmissive or reflective amplitude modulator such as a DMD or a light valve like an LCD (not shown) of a projector has no preferential polarization direction; such that when the projector is combined with a 3D polarization switcher in front of the lens, base light and highlight undergo equal transmission in both left and right perspective. Also, this depolarization step contributes to speckle reduction via polarization diversity. The light that is sampled with the sampler such as the sampling plate 15 before the depolarizer 35 however still has 1 polarization direction for the base illumination and an orthogonal polarization direction for the steered highlight illumination. In that case, however, a polarizer 34 installed in front of detection system 18 having a photosensor (e.g. single photodetector implementation) or photosensors (e.g. double detector or detector array implementation with multiple photodetectors) can block the base illumination while allowing the sampled highlight illumination to pass to detection system 18.

For a single photodetector or photosensor, the first photodetector or photosensor monitors the central position which corresponds to 0° at the aperture. However angle deviations can be generated in the order of +/−3.5°. In an optical system with only a single diffuser, it is preferred if the area of the central position, which is monitored by a first photodetector or photosensor, is configured to capture the entire range of angular deviations (e.g. +/−3.5°) in both horizontal and vertical directions.

The second peripheral photodetector or photosensor preferably monitors outside this range of angles, e.g. at angles >4°, preferably >5° more preferably 6° or larger. The maximum angle can be defined by the F-number of the optical system which may be 10.5 degrees, for example. An angle range which keeps the monitoring of light intensity at the peripheral position by the second photodetector or photosensor away from the angular range monitored by the first photodetector or photosensor at the central position can be selected to be an angle selected from 4° to 8° or 3° to 9° typically 6°.

Embodiment: Plurality of Diffusors

In another example of embodiments of the invention, a double diffuser can be used for the shaped light SL.

Figure 6:
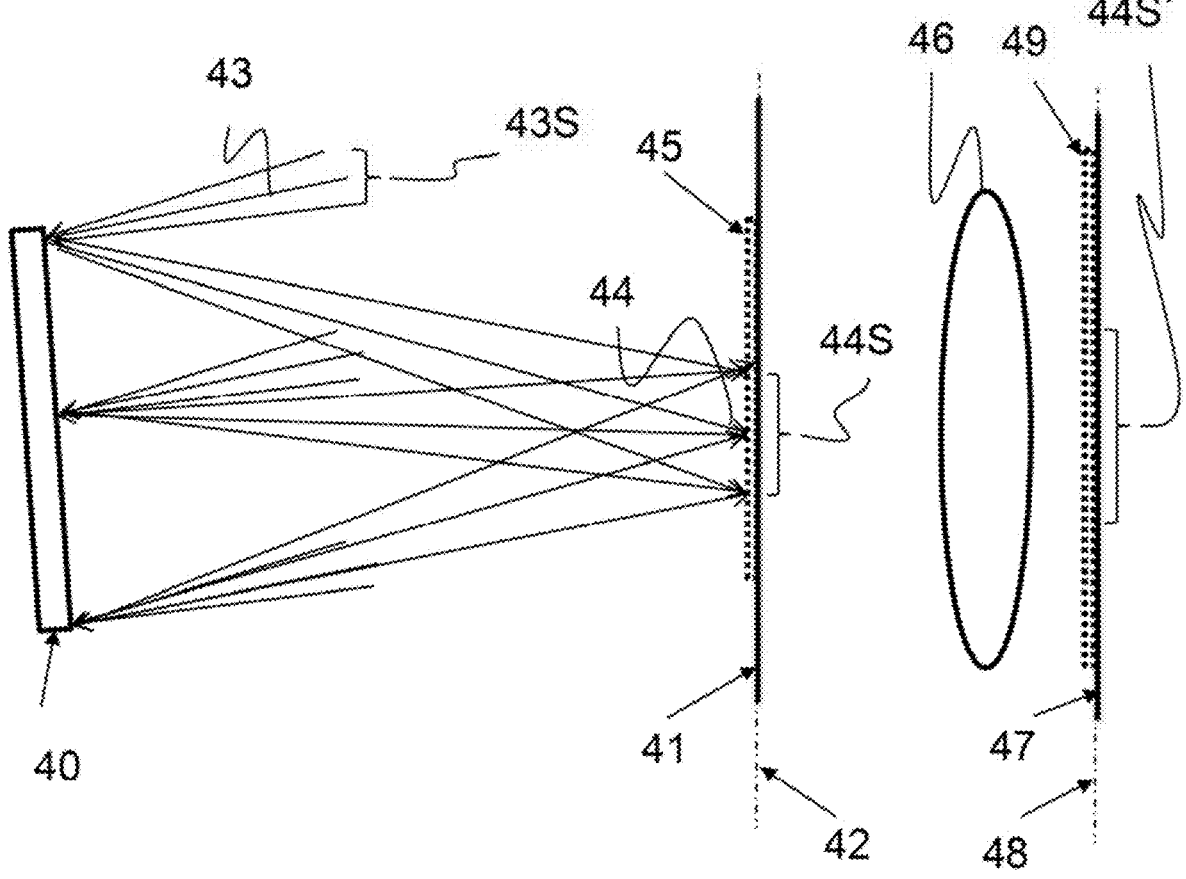
FIG. 6 shows an example of embodiment of the present invention with two diffusors instead of one.

This is illustrated on FIG. 6. FIG. 6 shows a light steering system with a phase modulator or phase only modulator 40 steering light onto a first diffuser 41 in a first intermediate image plane 42. The first diffuser 41 can be a moving diffuser. If an incoming laser beam 43 were perfectly collimated, the phase modulator 40 would be able to concentrate all the light in a single focus point 44. Because, in practical implementations, the laser beam is not perfectly collimated but shows an angular spread 43S, the light will spread out from the focus point to what is called the Point Spread Function or PSF. Instead of a point 44, a surface 44S of finite area on the diffuser 41 is illuminated. This finite area is then imaged onto the second diffuser 47 with a surface 44S'. The typical feature size of the diffusers 41 and 47 should be significantly smaller than the size of this area (44S and 44S', respectively) to avoid the internal structure of the diffusors 41 and 47 appearing in the projected image. Preferably, the typical feature size of the diffusers 41 and 47 should be less than one fifth of the PSF of the light steering system. The point spread function (PSF) at a first intermediate image 45 in the first image plane 42 and the second intermediate image 49 in the second intermediate image plane 48 typically is in the range of 5 to 20% of the image width. In this case, the typical feature size of the diffusers 41, 47 should be smaller than 1 to 4% of the image width, respectively. If the diffusers 41, 47 would contain features that are larger than the PSF, then it is possible that the diffusers 41, 47 would not properly diffuse (e.g. the outgoing angles would be a subset of range +/−α). It can even occur that the diffuser defect detection apparatus could be triggered as a result even if the diffusers are not broken or damaged.

Even if the typical feature size of the diffusers 41, 47 is significantly smaller than the PSF, the features can still be significantly larger than the pixels of the projected image and the structure of the diffusers 41, 47 can become visible in the projected image. This can be mitigated or avoided by moving the diffuser(s) 41, 47 at a speed such that a high number (e.g. larger than 10) of diffuser features pass each pixel during the imaging period. Note that for a pulse-width-modulated transmissive or reflective amplitude modulator, such as a DMD or LCOS, or a light valve, like an LCD, of a projector, the worst-case imaging period duration is the shortest pulse of the pulse-width-modulation scheme. If the diffuser feature size and speed of motion comply with the above conditions, it should introduce diffusion angles according to the FWHM characteristics and deliver the desired distribution of light in the aperture plane as well as introduce angular diversity for despeckling and render the diffuser features invisible in the projected image.

All this can be obtained from a single diffuser 41. In other words, it would be possible to position diffuser 41 of FIG. 6 at the position of diffuser 11 in FIG. 2A (or 2B, 2C, 2E, 2G, 5). However, as was discussed earlier, damage to that single diffuser 11 (even local) could cause all the light to be concentrated in a single point in the center of the aperture plane 13. And if the optical system of FIG. 2A (or 2B, 2C, 2E, 2G, 5) that images diffuser 11 onto the transmissive or reflective amplitude modulator 21, such as a DMD or LCOS or a light valve like an LCD of a projector, is bi-telecentric and the projection lens is object space telecentric, the exit pupil of the projection lens is an image of the aperture 19 of the aperture stop 14. Therefore, someone standing between the projection screen and the projection lens at the position of a highlight in the image and looking into the projection lens from a close distance will observe a very powerful point source. The size of the point is limited only by the fact that the laser source is not perfectly collimated. In this situation the acceptable laser exposure level (AEL) can be exceeded significantly and eye damage could start to occur even after an extremely short exposure. In other words, the reaction speed requirement for the detection circuit 18 and a laser shutdown circuit become demanding. Further, as will be explained below, there is some effect of the steering on the light distribution in the aperture plane 13. This will cause the concentration point in the aperture plane 13 to shift a little out of center, depending on where the highlight(s) are positioned in the image. A single central photodetector of the detection system 18 in the sampled aperture plane 17 with finite dimensions could fail to detect the diffuser fault because the light is concentrated outside the active area of the photodetector.

Instead of a single intermediate image 45 and a single (optionally moving) diffuser 41, an additional safety measure can be to introduce a second intermediate image plane 48 with a second diffuser 47. The second diffuser 47 can be a moving diffusor. This second diffuser 47 will then be positioned at the position of diffuser 11 in FIG. 2A (or 2B, 2C, 2E, 2G, 5). Relay optics 46 are preferably provided to image the first intermediate image 45 onto the second intermediate image 49. These relay optics 46 could have a magnification factor of 1 or a different magnification factor. This second diffuser stage guarantees that with either one of the diffusers 41, 47 failing, the light spot observed in the projection lens exit pupil will become somewhat smaller and the peak intensity higher, but light will not suddenly be concentrated into a point. Both diffusers 41, 47 preferably move at adequate speed, as discussed above, to introduce angular diversity for despeckling and to avoid that the structure of the diffuser 41 or 47 becomes visible in the projected image.

Preferably, the diffusers 41, 47 are dimensioned such that both diffusers 41, 47 contribute equally to the final spreading of the light across the aperture 19 and the projection lens pupil. For example, the two diffusers 41, 47 can have identical strength if the relay optical system 46 has a magnification factor of 1. Diffuser strength can be understood in this context as diffusing angle. More strength means a larger diffusing angle.

For example, in the specific case where the magnification factor of the relay optics is 1.3× the first diffuser 41 can be a Gaussian diffuser with FWHM of 8.8° and the second diffuser 47 can be a Gaussian diffuser with a FWHM of 6.8°.

In FIG. 6, the average incident angle on the first diffuser 41 will change if the focus spot is steered away from the center of the image toward the edges, for example to the top or the bottom.

Note however, that, in FIG. 6, the distance between the phase modulator 40 and the first intermediate image plane 42 is not shown to scale, and the PSF is larger than it would be in a typical implementation, for reasons of clarity of the illustration. In an actual system, the distance is around 20 times larger (and the divergence angle of the collimated incoming beam 20 times smaller). For example, with the phase modulator width and the intermediate image width both being 15 mm, the distance between the phase modulator and the first intermediate image plane 42 would typically be in the range of 150 to 250 mm.

A typical divergence of the incoming beam would be in the range of +/−0.1° till +/−0.2°. The variance introduced by steering the beam to the most extreme positions of the image would be in the range of +/−2° till +/−4°. When the intermediate image 45 is only half the size of the transmissive or reflective amplitude modulator 21, such as a DMD or LCOS or a light valve like an LCD of a projector, then translating these angles to the transmissive or reflective amplitude modulator 21, such as a DMD or LCOS or a light valve like an LCD of a projector, divides them by 2. Thus, steering introduces an angular shift at the transmissive or reflective amplitude modulator 21, such as a DMD or an LCOS or a light valve like an LCD of a projector, in the range of +/−1° till +/−2°.

The diffuser(s) 41, 47 introduce angles to largely fill the full acceptance angle of the transmissive or reflective amplitude modulator 21, 40 e.g. DMD of around +/−10 degrees. Thus, the distribution of angles in the system is dominated by the action of the diffusers 41, 47, and, therefore, so is the brightness distribution in the aperture plane 13 and the sampled aperture plane 17.

Still the effect of the steering angle is not negligible (around 10 to 20% of the total angular range on the transmissive or reflective amplitude modulator 21, 40 e.g. DMD). As a result light will move around a bit inside the aperture stop 14 and inside the projection lens exit aperture.

In the double diffuser system of FIG. 6, the light distribution in the aperture plane 13 (shown in FIGS. 2A, 2B, 2C, 2E, 2G and 5) changes significantly when either one of the two diffusers 41, 47 fails.

With the dimensioning of the diffuser 41 or 47 as indicated above (i.e. 8.8° and 6.8° FWHM and an optical relay magnification of 1.3), we get comparable effects when the first diffuser 41 is failing while the second diffuser 47 is intact compared to the first diffuser 41 being intact and the second diffuser 47 failing.

Figure 7:
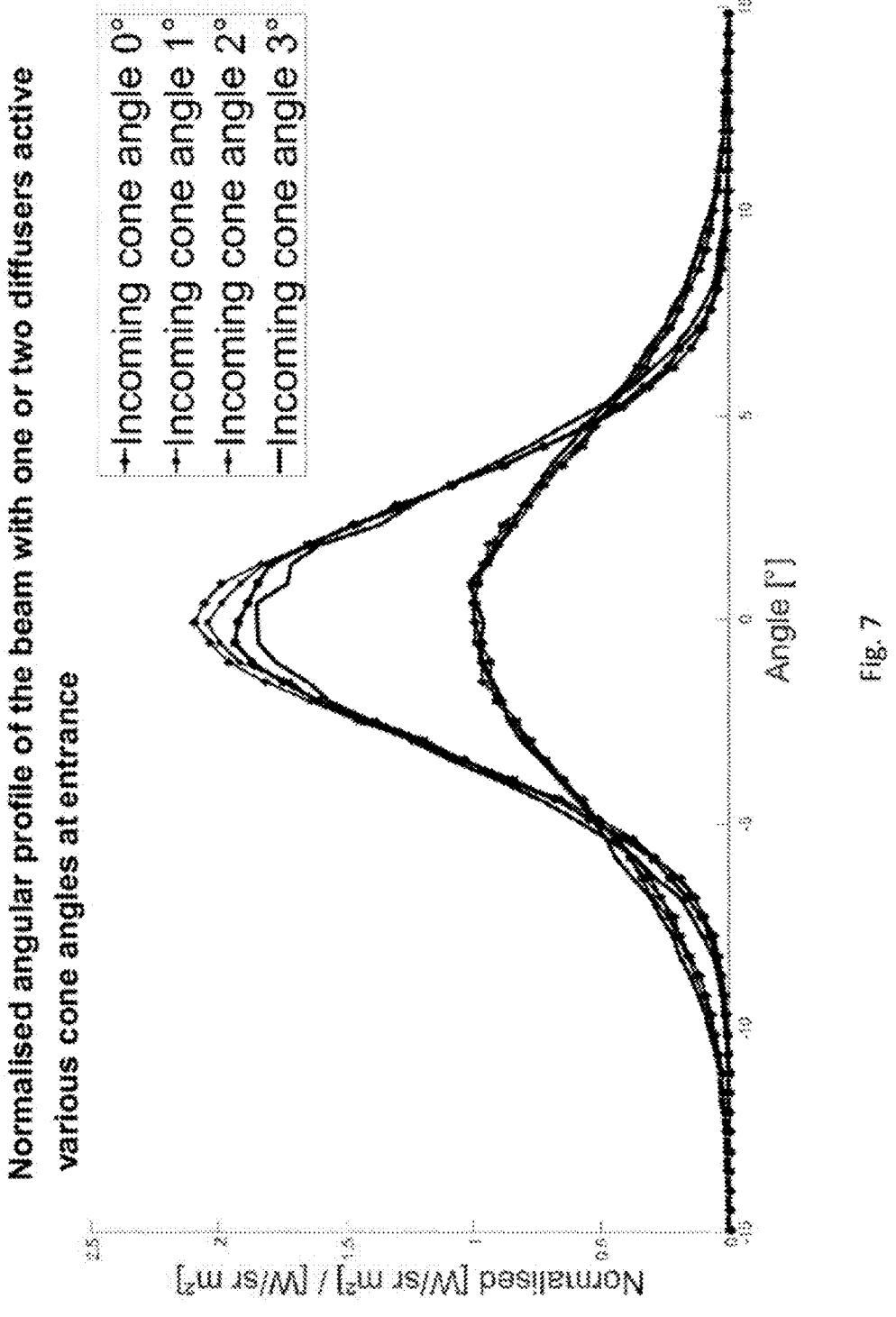
FIG. 7 shows the difference in light distribution across the aperture plane and the sampled aperture plane when one of the diffusors fails.

FIG. 7 illustrates the angular profile at the exit of the second diffuser 47 of FIG. 6. The curves are shown for different cone angles of the incoming laser light at the first diffuser 41 of FIG. 6 going from 0° cone angle (no steering) to 3.5° cone angle (maximum steering angle). The first diffuser 41 has a Gaussian profile with a FWHM of 8.8°, the second diffuser 47 has a Gaussian profile with a FWHM of 6.8° and the magnification factor of the optics imaging the first intermediate image 45 onto the second intermediate image 49 is around 1.27. Note that 8.8°/1.27 is approximately equal to 6.8° such that both diffusers 41, 47 contribute equally to the final diffusing angle. The lower curves correspond to the normal situation where both diffusers 41, 47 are working properly. The curves have been normalized to a peak intensity of 1 for each cone angle individually. The higher curves correspond to the situation where one of the diffusers 41, 47 is failing. It can be seen that the incoming cone angle only has a small effect on the angular profile, while there is a significant effect caused by one of the diffusers 41, 47 failing. Hence, it is possible to discriminate between a normal situation with both diffusers 41, 47 operational and a situation where one of the diffusers 41, 47 is failing regardless of the angle profile variability introduced by the beam steering.

For an incoming cone angle of 0°, the peak intensity at an outgoing angle of 0° increases by a factor 1.91× when one of the diffusers 41, 47 fails, while for an incoming cone angle of 3.5° this factor is a somewhat lower at 1.70×. However, a central detector system, as illustrated in FIG. 3A, that triggers, for example, when the peak intensity at an outgoing angle of 0° becomes higher than 1.26× (times) the nominal intensity, could detect a diffuser failure in every steering situation and would still allow for some variability of the nominal light output by +/−25%. The above numbers have been derived aiming to generate a single central highlight circle with a diameter equal to 11% of the image width. For a single detector system to operate reliably also when steering for a highlight that is off-center, it is important and often mandatory that the brightness roll-off from a center highlight to a corner highlight is small enough to still pass the threshold when one of the diffusers 41, 47 is failing. With the example numbers above, corner brightness would need to more than 75% of the center brightness.

When the total light flux cannot be guaranteed to remain constant and/or when the brightness roll-off from center to corner is too large, it is a preferred embodiment to use a detector system 18 with two or more photosensors. Rather than a detection system 18 that looks at the brightness in the center of the aperture plane 13, 17 only, this embodiment provides a detector system 18 to actually look at the cross-section of the brightness profile. Since we largely expect the profile to be rotationally symmetrical (e.g. apart from a minor decentration caused be a variation in the dominant steering angle), it would be sufficient for the detection system 18 to have a line detector, as illustrated in FIG. 3C, that senses the intensity from the center of the aperture to the edge of the aperture.

The number of sensing elements comprised in the line sensor of the detection system 18 can be varied. The larger the number or sensing elements, the more accurate the profile can be sensed. However, it becomes more difficult to interpret the results. If the curves are smooth in both the normal condition and the failed diffuser condition, a minimal amount of sensing elements can be used. This is the case, for example, with the double Gaussian diffuser of FIG. 6 setup as illustrated by the curves in FIG. 7. One can than put a first sensor 31 in the center of the aperture corresponding to an outgoing angle of 0° to determine the peak brightness level and a second sensor 32 at a position in the aperture corresponding to an outgoing angle of up to 6°, for example < or equal to 6°, whereby 6° is the angle at which the light ray departs from the second diffuser 47 relative to the optical axis. With the dual sensor system as illustrated in FIG. 3B the ratio between the brightness at the first sensor 31 and the one brightness at the position of the second sensor 32 is significantly different when one of the diffusers 41, 47 fails. The anomaly can be detected as an increase or decrease of this ratio, but it is preferred if the anomaly is detected by only by two photodetectors or photosensors, e.g. the anomaly is detected as a decrease in an intensity ratio of what is monitored at a peripheral position (e.g. at an angle within the ranges 4° to 8° or 3° to 9°) compared with what is measured at a central position (angle less than 9°, preferably less than 8°, less than 4° or less than 3°) of the at least one bundle of rays or wherein the anomaly is detected as a change in FWHM.

Therefore, what is needed for the detection system is a comparator circuit that compares the value of the second sensor 32 with a fraction (⅓) of the value from the first sensor 31. The comparator circuit is preferably configured to give a digital output that indicates either in a "no fault" or a "faulty" condition. Also, the detection system 18 may be configured to generate a signal if the faulty condition is detected; whereby the signal can be an alarm signal. The detection system 18 may be configured to generate commands to reduce the intensity of the light emitted by the laser light source or to block or deflect the laser light or turn off the light source.

Measurement or calculation of a ratio between measurements of light intensity by two photodetectors or photosensors (preferably only two photodetectors or photosensors) has the advantage over absolute measurements that re-calibration of values which indicate a defect is not required. Using a ratio of intensities to indicate a defect is more robust than absolute measurements to changes such as dimming or highlighting applied to a projected image or other changes of the power used by the projector.

The central position corresponds to 0° at the aperture. However, angle deviations can be generated in the order of +/−3.5°. In an optical system with only a single diffuser, it is preferred if the area of the central position, which is monitored by a first photodetector or photosensor, is configured to capture the entire range of angular deviations (e.g. +/−3.5°) in both horizontal and vertical directions.

The second peripheral photodetector or photosensor preferably monitors outside this range of angles, e.g. >4°, preferably >5° more preferably 6° or larger. The maximum angle can be defined by the F-number of the optical system which may be 10.5 degrees, for example. An angle range which keeps the monitoring of light intensity at the peripheral position, which is monitored by the second photodetector or photosensor, away from the angular range monitored by the first photodetector or photosensor at the central position, can be selected to from an angle in the ranges 4° to 8° or 3° to 9°, typically 6°.

In a normal situation with both diffusers 41, 47 working, the second sensor 32 will be higher than ⅓ of the center value, putting the output of the comparator to the "no fault" condition. But when either one of the diffusers 41, 47 fails, the brightness at a 6° angle (or an angle within the ranges an angle in the rages 4° to 8° or 3° to 9°) will stay roughly the same, while the center brightness increases and the second sensor 32 will measure below ⅓ of the first sensor 31, thereby causing the output of the comparator circuit to change to the "faulty" condition. This output signal can be used to generate an alarm signal or to shut down the laser light source or reduce its power to levels that are known to be safe even when only one diffuser is functional or to bock or divert the laser. Because this can be pure hardware implementation, it can be fast and reliable. No microprocessor is needed and use of a hardware comparator is one important advantage of the dual sensor system. On the other hand, a multi-sensor system (more than two sensors) can require a processor, such as a microprocessor, to determine if the light distribution correlates more to what is expected from a single diffuser or correlates more to what is expected from a double diffuser. Special measures need preferably to be taken to guarantee that the processor such as the microprocessor, its operating system and the software are fail-safe and operate in real-time.

Another advantage of the two sensors method compared to the single central sensing method, is that detection is not affected by the total light flux through the aperture as it relies on a relative comparison between the two sensors to determine the shape of the Gaussian distribution.

Figure 8:
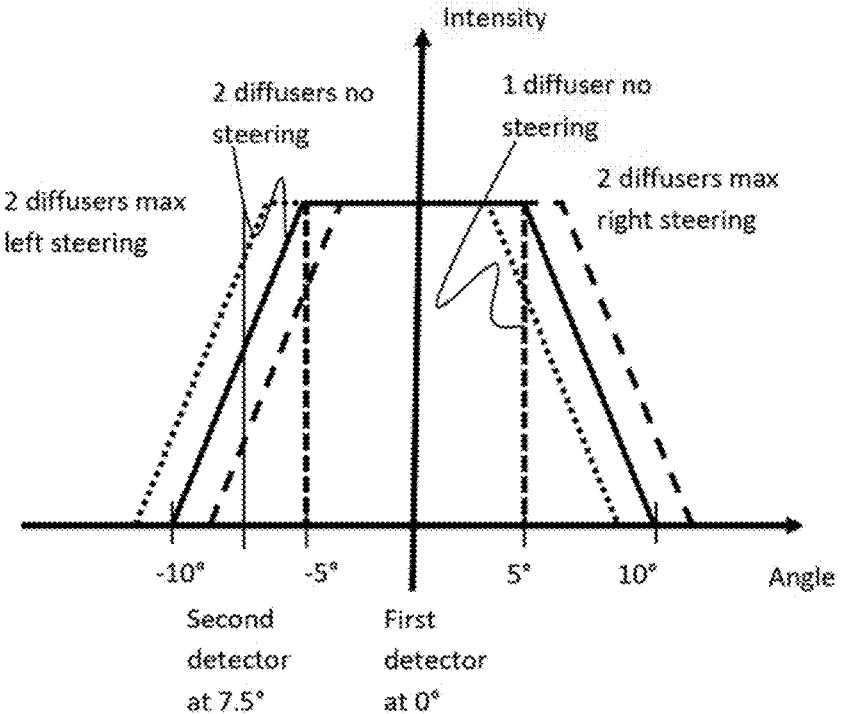
FIG. 8 shows the effect of steering angle on the distribution across the aperture plane for a double top-hat diffuser system.

The same approach could also work with non-Gaussian diffusers, for example Top-Hat diffusers, but the position of the second sensor 32 is preferably optimized to correspond to an angle where the impact of a failing diffuser 41, 47 on the ratio first sensor value/second sensor value is big enough to give a reliable detection. An example is shown in FIG. 8. Both diffusers 41, 47 have an ideal top hat profile of +/−5°. When either one of the diffusers 41, 47 fails the angular profile that will be seen is this top hat profile in the range of +/−5°. When both diffusers 41, 47 are working properly the resulting profile will be a trapezoid starting at −10° and ending at +10°. Note, however, that this is without any steering. When the steering angle is +/−2°, the trapezoid profile will shift to the left or to the right, respectively. The same will happen with the top hat profile of a single diffuser 41 (not shown). The first detector 31 positioned at 0° will always detect the same maximum intensity. However, care must preferably be taken at what angle to position the second detector 32. If, for example, it would be positioned at 6°, then by steering for a maximum shift to the left it would always detect maximum intensity, even if one of the diffusers 41, 47 would fail. If in this example, however, it is positioned at 7.5°, it would always detect an intensity below 80% and above 20% of maximum. Whereas, when one diffuser 41, 47 breaks, it would detect 0%, even when steering to the maximum left position. By setting the comparator to be triggered if the intensity of the second sensor 32 is <20% of the intensity detected by the first sensor 31, one could reliably discriminate between the situation where both diffusers 41, 47 are working versus the situation where only one diffuser is working.

The diffusers 41, 47 do not necessarily have to have the same strength, but in case of a strong and a weak diffuser 41, 47, it becomes easier to detect the failure of the strong diffuser while detection failure of the weak diffuser becomes more difficult.

Ultimately, with such a detection circuit and laser diversion or shutdown mechanism, it could be considered to have only a single diffuser and a single intermediate image plane 42. However, a number of important conditions would need to be met:

The sensing area of the central sensor 31 would have to be big enough to make sure that the undiffused laser beam (only the very small amount of angular spread coming from the laser source illuminating the light steering modulator is present) will hit this area, regardless of optical alignment tolerances and steering angle.

The central sensor 31 may not saturate even if all the sampled laser energy is directed to it. The photosensor such as a photodiode, photoresistor, phototransistor or similar can be selected so that this is taken into account by properly dimensioning a series resistor. In addition, neutral density filters could be applied to reduce the light intensity onto the photodiode, photoresistor, phototransistor or similar.

Since the radiance levels in front of the lens are way higher than allowed, the reaction time to shut down the lasers needs to be fast.

Methods according to the present invention can be performed by a computer system. The present invention can use a processing engine to carry out functions. The processing engine preferably has digital processing capability such as provided by one or more microprocessors, FPGA's, or a central processing unit (CPU) and/or a Graphics Processing Unit (GPU), and which is adapted to carry out the respective functions by being programmed with software, i.e. one or more computer programs. References to software can encompass any type of programs in any language executable directly or indirectly by a processor, either via a compiled or interpretative language. The implementation of any of the methods of the present invention can be performed by logic circuits, electronic hardware, processors or circuitry which can encompass any kind of logic or analog circuitry, integrated to any degree, and not limited to general purpose processors, digital signal processors, ASICs, FPGAs, discrete components or transistor logic gates and similar.

A processing device may have memory (such as non-transitory computer readable medium, RAM and/or ROM), an operating system, optionally a display such as a fixed format display, ports for data entry devices such as a keyboard, a pointer device such as a "mouse", serial or parallel ports to communicate other devices, network cards and connections to connect to any of the networks.

The software can be embodied in a computer program product adapted to carry out the functions of any of the methods of the present invention, for example as itemized below, when the software is loaded onto a computer and executed on one or more processing engines, such as microprocessors, ASIC's, FPGA's, etc. Hence, any of the embodiments of the present invention can incorporate a computer system capable of running one or more computer applications in the form of computer software.

The methods described with respect to embodiments of the present invention above can be performed by one or more computer application programs running on the computer system by being loaded into a memory and run on or in association with an operating system, such as Windows™ supplied by Microsoft Corp, USA, Linux, Android or similar. The computer system can include a main memory, preferably random-access memory (RAM), and may also include a non-transitory hard disk drive and/or a removable non-transitory memory, and/or a non-transitory solid-state memory. Non-transitory removable memory can be an optical disk such as a compact disc (CD-ROM or DVD-ROM), a magnetic tape, which is read by and written to by a suitable reader. The removable non-transitory memory can be a computer readable medium having stored therein computer software and/or data. The non-volatile storage memory can be used to store persistent information that should not be lost if the computer system is powered down. The application programs may use and store information in the non-volatile memory.

The software embodied in the computer program product is adapted to carry out any of the functions of embodiments of the present invention (see aspects 87 and 88) when the software is loaded onto the respective device or devices and executed on one or more processing engines such as microprocessors, ASIC's, FPGA's etc.

The invention claimed is:

1. An optical system configured to monitor a state of a diffuser, the optical system comprising:
   the diffuser,
   a light source emitting at least one light beam,
   a projector,
   a transmissive or reflective spatial light modulator of the projector, a sampler, a detection system,
   and an analyzer; and
   wherein the light source is configured to illuminate the diffuser, the at least one light beam comprises at least one bundle of rays of light exiting the diffuser being for illumination of the transmissive or reflective spatial light modulator of the projector,
   the optical system further comprising the sampler configured to sample the at least one light beam exiting the diffuser and to re-direct the light beam sample towards the detection system, wherein the detection system is configured to receive the light beam sample and is coupled to an analyzer configured to generate a signal when an anomaly is detected in a distribution of a light intensity in a cross-section of the light beam sample, wherein the anomaly is detected as a decrease in intensity ratio between a peripheral position and a central position of the at least one bundle of rays or wherein the anomaly is detected as a change in full width at half maximum (FWHM), and
   wherein the optical system is configured to have the at least one light beam incident on an aperture in an aperture plane and wherein the sampler is configured to sample a light distribution in the aperture in the aperture plane, and the aperture is filled with light and the optical system is configured to have all rays of light that exit the diffuser with a same angle ending up at a same point in the aperture.

2. The optical system according to claim 1, wherein the optical system is configured to image the diffuser onto the transmissive or reflective spatial light modulator and is configured to be bi-telecentric or wherein the optical system is minimally configured to be object space telecentric.

3. The optical system according to claim 1, wherein the detection system comprises one or more detectors, or
   wherein the detection system comprises a detector selected from a pair of light sensors, photo-sensor(s), photodiode(s), photoresistor(s), phototransistor(s), a linear array of photo-sensors, and an array of N columns and M lines of photo-sensors, or wherein the detection system has a first and a second light detector or a first and a second light sensor and the optical system is configured to have the light beam incident on the first and second light detectors or the first and second light sensors, and wherein the analyzer is configured to calculate a ratio of a first light intensity measured at a position of the first light detector or first light sensor and of a second light intensity measured at the position of the second light detector or the second light sensor, which ratio is indicative that the anomaly has been detected in the distribution of the light intensity in the cross-section of the light beam sample.

4. The optical system according to claim 1, wherein the signal is an alarm signal, and in response to the generation of the signal, the optical system is configured to reduce an intensity of the light beam from the light source, or to reduce highlighting or to block or to deflect the light beam or to shut down the light source.

5. The optical system according to claim 1, wherein the cross-section is an attenuated copy of a cross-section of the at least one light beam in the aperture.

6. The optical system according to claim 1, wherein the projector has a projection lens and the detection system is configured to evaluate the distribution of light in an exit pupil of the projection lens.

7. The optical system according to claim 1, wherein the sampler is positioned between an exit surface of the diffuser and the transmissive or reflective spatial light modulator.

8. The optical system according to claim 1, wherein the sampler is a semi-transparent mirror whereby a majority of light incident on the sampler is transmitted towards the reflective or transmissive spatial light modulator.

9. An optical apparatus comprising:

a transmissive or reflective spatial light modulator of a projector, a diffuser, a depolarizer installed at an aperture plane so that a light beam transmitted to the transmissive or reflective spatial light modulator of the projector has no preferential polarization direction, a sampler configured to sample the light beam exiting the diffuser and to re-direct the light beam sample towards a detection system, wherein light that is sampled with the sampler before the depolarizer, has one polarization direction for a base illumination and an orthogonal polarization direction for steered highlight illumination; and a polarizer installed in the detection system is configured to block the sampled base illumination while allowing the sampled highlight illumination to pass or vice versa.

10. The optical apparatus according to claim 9, wherein the detection system comprises one or more detectors selected from a photo-sensor, a pair of light sensors, photodiode(s), photoresistor(s), phototransistor(s), a linear array of photo-sensors, and an array of N columns and M lines of photo-sensors.

11. The optical apparatus according to claim 9, wherein the detection system is coupled to an analyzer configured to generate a signal when an anomaly is detected in a distribution of the light intensity in a cross-section of the light beam sample.

12. The optical apparatus according to claim 9, further comprising a 3D polarization switcher in front of a lens, wherein a base image to be projected and highlights of an image to be projected undergo equal transmission.

13. The optical apparatus according to claim 9, comprising a polarizer positioned between the sampler and the detection system, and wherein when shaped light and base light are combined based on their respective polarization, the polarizer is configured to separate the shaped light and the base light before the light reaches the detection system.

14. The optical apparatus according to claim 9, wherein the sampler samples a light distribution in an aperture in an aperture plane.

15. The optical apparatus according to claim 9, further comprising a coherent light source configured to illuminate the diffuser by at least one light beam, the at least one light beam comprising at least one bundle of rays of light exiting the diffuser being for illumination of the transmissive or reflective spatial light modulator of the projector, wherein the detection system is coupled to an analyzer configured to generate a signal when an anomaly is detected in the distribution of the light intensity in a cross-section of the light beam sample.

16. The optical apparatus according to claim 15, wherein the signal is an alarm signal and in response to the generation of the signal, the optical apparatus is configured to reduce an intensity of the light beam from the coherent light source, or to reduce highlighting or to block or to deflect the light beam or to shut down the light source.

17. The optical apparatus according to claim 11, wherein the cross-section is an attenuated copy of a cross-section of the at least one light beam in the aperture.

18. The optical apparatus according to claim 9, wherein the detection system is configured to evaluate the distribution of light in an exit pupil of the projector.

19. The optical apparatus according to claim 9, wherein the sampler is positioned between an exit surface of the diffuser and the transmissive or reflective spatial light modulator.

\* \* \* \* \*